(12) United States Patent
Kubota et al.

(10) Patent No.: US 8,570,670 B2
(45) Date of Patent: Oct. 29, 2013

(54) IMAGING LENS

(75) Inventors: Yoji Kubota, Nagano (JP); Kenichi Kubota, Nagano (JP); Hitoshi Hirano, Nagano (JP); Ichiro Kurihara, Tochigi (JP); Yoshio Ise, Tochigi (JP); Sumio Fukuda, Tochigi (JP)

(73) Assignees: Optical Logic Inc., Nagano (JP); Kantatsu Co., Ltd., Tochigi (JP)

( * ) Notice: Subject to any disclaimer, the term of this patent is extended or adjusted under 35 U.S.C. 154(b) by 55 days.

(21) Appl. No.: 13/409,510

(22) Filed: Mar. 1, 2012

(65) Prior Publication Data

US 2012/0275037 A1    Nov. 1, 2012

Related U.S. Application Data

(60) Provisional application No. 61/480,187, filed on Apr. 28, 2011.

(51) Int. Cl.
*G02B 13/04* (2006.01)
*G02B 3/02* (2006.01)

(52) U.S. Cl.
USPC .............. 359/753; 359/714; 359/770

(58) Field of Classification Search
USPC ........................... 359/714, 753, 770
See application file for complete search history.

(56) References Cited

U.S. PATENT DOCUMENTS

2008/0144193 A1 *   6/2008   Adachi ............... 359/770

FOREIGN PATENT DOCUMENTS

JP              2009-134175 A     6/2009

* cited by examiner

*Primary Examiner* — Evelyn A. Lester
(74) *Attorney, Agent, or Firm* — Kubotera & Associates, LLC

(57) ABSTRACT

An imaging lens includes a first lens having negative refractive power; a second lens having negative refractive power; a third lens; a fourth lens; and a fifth lens. The first lens has a positive curvature radius on an image plane side. The second lens has a sharp convex surface, and a positive curvature radius on the image plane side. The third lens has a positive curvature radius on the object side and a negative curvature radius on the image plane side. The fourth lens has a negative curvature radius on the object side and a positive curvature radius on the image plane side. The fifth lens has a positive curvature radius on the object side and a negative curvature radius on the image plane side, and an aspheric surface.

10 Claims, 15 Drawing Sheets

IMAGING LENS

CROSS-REFERENCE TO RELATED APPLICATIONS

The application claims the benefit under 35 U.S.C. 119(e) of the provisional application No. 61/480,187, filed on Apr. 28, 2011.

BACKGROUND OF THE INVENTION AND RELATED ART STATEMENT

The present invention relates to an imaging lens for forming an image of an object on an imaging element such as a CCD sensor and a CMOS sensor. In particular, the present invention relates to an imaging lens suitable for mounting on a cellular phone, a digital still camera, a portable information terminal, a security camera, an overhead camera, a scanner, a network camera, and the like.

With advancement in ICT (Information and Communication Technology), information and knowledge are increasingly shared. In these years, ICT devices, which are developed based on the ICT, have been brought. Among them, an overhead camera, so-called a document camera, which can enlarge and project objects including from a two-dimensional object such as textbooks and reference materials to three-dimensional objects, have been widely used mainly in educational sites and conference rooms. Since such a document camera can enlarge and display a reference material or an actual object as is, for example, in case of use in a conference room, a speaker can make variations in a presentation flexibly, and thereby listeners can easily understand contents of the presentation and see an actual object as being projected.

Since a document camera is usually placed on a desk, it is preferred to have a small size and also to be able to project or display more information finely, which includes letters and figures. For this reason, in addition to a small size, an imaging lens for mounting on the document camera is required to have a high resolution and a wide imaging angle of view so as to attain a wide imaging range.

However, it is difficult to attain miniaturization while satisfactorily correcting aberrations for such a high resolution and also attain the wide imaging angle of view. For example, if a size of an imaging lens is reduced, refractive power of each lens needs to be strong, so that it is difficult to satisfactorily correct aberrations. Accordingly, upon actual designing of an imaging lens, it is a key to meet those requirements in a balanced manner.

As an imaging lens with a wide imaging angle of view, for example, the one described in Patent Reference has been known. The imaging lens includes a front group having negative refractive power and a rear group having positive refractive power, arranged in the order from an object side. The front group includes a first lens having a biconcave shape and a second lens that has a shape of a meniscus lens directing a concave surface thereof to the object side and is negative. The rear group includes a third lens having a biconvex shape, a fourth lens having a biconcave shape, and a fifth lens having a biconvex shape.

According to the configuration described above, it is possible to restrain an increase in distortion accompanied by widening the imaging angle of view while attaining such widening, by restraining a ratio of a composite focal length of the front group to a focal length of the whole lens system and a ratio of a composite focal length of the rear group to the focal length of the whole lens system respectively within preferred ranges.

Patent Reference Japanese Patent Publication No. 2009-134175

In the imaging lens for mounting on such a document camera, it is strongly required to have an ability of exactly imaging an object to project. According to the imaging lens described in Patent Reference, although it has the wide angle of view in a diagonal direction, which is as wide as about 130°, because of relatively large distortion, it is difficult to exactly image the object.

Such an issue is not specific to the imaging lens for mounting on the document camera, and is common among imaging lenses for mounting on relatively small cameras such as digital still cameras, portable information terminals, security cameras, or network cameras.

In view of the problems of the conventional techniques described above, an object of the present invention is to provide an imaging lens that can satisfactorily correct distortion in spite of a wide angle of view thereof.

SUMMARY OF THE INVENTION

In order to solve the problems, according to the invention, an imaging lens includes a first lens having negative refractive power; a second lens having negative refractive power; a third lens having positive refractive power; a fourth lens having negative refractive power; and a fifth lens having positive refractive power, arranged in this order from an object side to an image side. The first lens is formed in a shape so that a curvature radius of an image-side surface thereof is positive. The second lens is formed in a shape so that an object-side surface thereof directs to the object side a convex surface, which is sharply convex surface as it goes from an optical axis to the periphery and so that a curvature radius of an image-side surface thereof is positive. The third lens is formed in a shape so that a curvature radius of an object-side surface thereof is positive and a curvature radius of an image-side surface thereof is negative. The fourth lens is formed in a shape so that a curvature radius of an object-side surface thereof is negative and a curvature radius of an image-side surface thereof is positive. The fifth lens is formed in a shape so that a curvature radius of an object-side surface thereof is positive and a curvature radius of an image-side surface thereof is negative and is formed as an aspheric surface having an inflection point on the image-side surface thereof.

According to the imaging lens having the above-described configuration, it is possible to widen an imaging angle of view with the first lens having negative refractive power and the second lens similarly having negative refractive power. In addition, it is possible to suitably correct distortion accrued in the first lens by the object-side surface of the second lens and the image-side surface of the fifth lens.

In the imaging lens having the above-described configuration, the second lens preferably has weaker refractive power than that of any of the first lens, the third lens, the fourth lens, and the fifth lens. Generally speaking, when two lenses having negative refractive power are arranged in order from the object side and the refractive power of a lens arranged on the image plane side is increased relatively while keeping a focal length of the whole lens system constant, a position of a principal point of the whole lens system moves in a direction to be away from the second lens (to the image plane side), so that the back focal length is long. Such lens configuration is not advantageous for miniaturization of the imaging lens. For this reason, according to the invention, miniaturization of the imaging lens is attained while attaining wider imaging angle of view and correction of distortion in a balanced manner, by having the refractive power of the second lens have weakest refractive power in the whole lens system.

When the whole lens system has a focal length f and the second lens has a focal length f2, the imaging lens having the above-described configuration preferably satisfies the following conditional expression (1):

$$-40 < f2/f < -5 \quad (1)$$

When the imaging lens satisfies the conditional expression (1), it is possible to more suitably attain miniaturization of the imaging lens. When the value exceeds the upper limit "−5", the second lens has strong refractive power in relative to that of the whole lens system, so that an effective diameter of the first lens increases and it is difficult to attain miniaturization of the imaging lens. On the other hand, when the value is below the lower limit "−40", the second lens has weak refractive power in relative to that of the whole lens system. Although such weak refractive power is advantageous for miniaturization of the imaging lens, since chromatic aberration of magnification is insufficiently corrected (that of a short wavelength increases in a minus direction in relative to that of a reference wavelength), it is difficult to obtain satisfactory imaging performance.

When a curvature radius of an image-side surface of the first lens is R2 and a curvature radius of an object-side surface of the second lens is R3, the imaging lens having the above-described configuration preferably satisfies the following conditional expression (2):

$$0.01 < R2/R3 < 0.4 \quad (2)$$

When the imaging lens satisfies the conditional expression (2), it is possible to restrain astigmatism within a satisfactory range, while restraining distortion within a satisfactory range. When the value exceeds the upper limit "0.4", although it is advantageous for correcting barrel-shaped (minus) distortion, a tangential surface tilts in a minus direction (the object side) and the astigmatic difference increases. For this reason, it is difficult to restrain astigmatism within satisfactory range. On the other hand, when the value is below the lower limit "0.01", the barrel-shaped distortion increases and the tangential surface tilts in a plus direction (the image plane side). Since the astigmatic difference increases also in this case, it is difficult to restrain the astigmatism within satisfactory range.

When the first lens has a focal length f1 and the second lens has a focal length f2, the imaging lens having the above-described configuration preferably satisfies the following conditional expression (3):

$$0.02 < f1/f2 < 0.8 \quad (3)$$

When the imaging lens satisfies the conditional expression (3), it is possible to restrain a chromatic aberration of magnification within satisfactory range while correcting the field curvature. When the value exceeds the upper limit "0.8", the first lens has weak refractive power in relative to that of the second lens. Although such weak refractive power is advantageous for correcting the chromatic aberration of magnification, since the image surface tilts in the minus direction (the object side), it is difficult to obtain satisfactory imaging performance. On the other hand, when the value is below the lower limit "0.02", the first lens has strong refractive power in relative to that of the second lens, so that the chromatic aberration of magnification is insufficiently corrected. In addition, the image surface tilts in the plus direction (the image plane side) and the astigmatic difference increases. Therefore, it is difficult to obtain satisfactory imaging performance also in this case.

When the imaging lens having the above-described configuration further satisfies the following conditional expression (3A), it is possible to restrain the distortion and the astigmatism within more satisfactory ranges:

$$0.02 < f1/f2 < 0.5 \quad (3A)$$

The imaging lens having the above-described configuration preferably satisfies the following conditional expression (4) when the whole lens system has the focal length f and the third lens has a focal length f3:

$$0.5 < f3/f < 1.2 \quad (4)$$

When the imaging lens satisfies the conditional expression (4), it is possible to restrain the astigmatism and the field curvature within satisfactory ranges while restraining the chromatic aberration within satisfactory range. When the value exceeds the upper limit "1.2", since the third lens has weak refractive power in relative to that of the whole lens system, an axial chromatic aberration is excessively corrected (that of a short wavelength increases in a plus direction in relative to that of a reference wavelength), and an off-axis chromatic aberration is insufficiently corrected.

Moreover, since the image surface tilts in the plus direction, it is also difficult to restrain field curvature within satisfactory range. Furthermore, since the astigmatic difference increases, it is also difficult to restrain the astigmatism within satisfactory range. On the other hand, when the value is below the lower limit "0.5", the third lens has strong refractive power in relative to that of the whole lens system, so that the axial chromatic aberration is insufficiently corrected. Furthermore, the image surface tilts in the minus direction and the astigmatism also increases. Therefore, in either case, it is difficult to obtain satisfactory imaging performance.

The imaging lens having the above-described configuration preferably satisfies the following conditional expression (5) when a distance on the optical axis from the image-side surface of the second lens to the object-side surface of the third lens is df and a distance on the optical axis from the image-side surface of the third lens to the object-side surface of the fourth lens is dr:

$$0.8 < df/dr < 2.5 \quad (5)$$

When the imaging lens satisfies the conditional expression (5), it is possible to restrain the astigmatism within satisfactory ranges, while restraining the chromatic aberrations of magnification and the distortion within satisfactory ranges in a balanced manner. When the value exceeds the upper limit "2.5", the chromatic aberration of magnification is insufficiently corrected and the barrel-shaped distortion increases, so that it is difficult to obtain satisfactory imaging performance. On the other hand, when the value is below the lower limit "0.8", although it is advantageous for correcting the chromatic aberrations and the barrel-shaped distortion, the image surface tilts in the minus direction and the astigmatic difference increases, so that it is difficult to obtain satisfactory imaging performance also in this case.

The imaging lens having the above-described configuration preferably satisfies the following conditional expression (6) when the whole lens system has the focal length f and a composite focal length of the fourth lens and the fifth lens is f45:

$$5 < f45/f < 15 \quad (6)$$

When the imaging lens satisfies the conditional expression (6), it is possible to correct the field curvature while restraining an incident angle of a light beam emitted from the imaging lens to the imaging element within certain range. As well known in the art, for light beams that an imaging element can take, so-called "a maximum incident angle" is set as an incident angle limit in view of an imaging element structure. A light beam outside the range of the maximum incident angle may result in an image with a dark periphery due to a shading phenomenon. For this reason, it is necessary to restrain the incident angle from the light beam emitted from the imaging lens to the imaging element within the certain range.

In the conditional expression (6), when the value exceeds the upper limit "15", the composite refractive power of the fourth lens and the fifth lens is weak in relative to the refractive power of the whole lens system, and the exit angle of a light beam emitted from the imaging lens increases, so that it is difficult to restrain the incident angle of a light beam emitted from the imaging lens to the imaging element within certain range. In addition, since the image surface tilts in the plus direction, it is difficult to obtain satisfactory imaging performance.

On the other hand, when the value is below the lower limit "5", the composite refractive power of the fourth lens and the fifth lens is strong in relative to the refractive power of the whole lens system. Therefore, although it is easier to restrain the incident angle of a light beam emitted from the imaging lens to the imaging element within the certain range, the image surface tilts in the minus direction, and the astigmatic difference increases. Therefore, it is difficult to obtain satisfactory imaging performance also in this case.

The imaging lens having the above-described configuration preferably satisfies the following conditional expression (7) when the fourth lens has Abbe's number vd4 and the fifth lens has Abbe's number vd5:

$$vd4<35 \text{ and } 45<vd5<80 \quad (7)$$

When the imaging lens satisfies the conditional expression (7), it is possible to restrain the chromatic aberrations within satisfactory ranges. When the value is outside the range of the conditional expression (7), both the axial and the off-axis chromatic aberrations are insufficiently corrected, and it is difficult to obtain satisfactory imaging performance.

Moreover, the imaging lens having the above-described configuration preferably further satisfies the following conditional expression (8) when the first lens has Abbe's number vd1, the second lens has Abbe's number vd2, and the third lens has Abbe's number vd3:

$$45<vd1<80, 45<vd2<80, \text{ and } 45<vd3<80 \quad (8)$$

When the imaging lens satisfies the conditional expression (8), it is possible to restrain the chromatic aberrations within more satisfactory ranges. When the value is outside the range of the conditional expression (8), both the axial and the off-axis chromatic aberrations are insufficiently corrected, and it is difficult to obtain satisfactory imaging performance.

In addition, the imaging lens having the above-described configuration preferably satisfies the following conditional expression (9) when the fourth lens has a focal length f4 and the fifth lens has a focal length f5:

$$-1.5<f4/f5<-0.5 \quad (9)$$

When the imaging lens satisfies the conditional expression (9), it is possible to restrain the chromatic aberrations and the astigmatism within satisfactory ranges. When the value exceeds the upper limit "−0.5", the chromatic aberrations are excessively corrected. Furthermore, the tangential surface tilts in the plus direction and the astigmatic difference also increases. Therefore, it is difficult to obtain satisfactory imaging performance. On the other hand, when the value is below the lower limit "−1.5", the chromatic aberrations are insufficiently corrected. In addition, the tangential surface tilts in the minus direction and the astigmatic difference also increases. Therefore, it is difficult to obtain satisfactory imaging performance also in this case.

According to the imaging lens of the invention, it is possible to provide an imaging lens with satisfactorily corrected distortion in spite of a wide angle of view thereof.

DETAILED DESCRIPTION OF PREFERRED EMBODIMENTS

Hereunder, referring to the accompanying drawings, an embodiment of the present invention will be fully described. FIGS. 1, 4, 7, 10, and 13 are sectional views of imaging lenses in Numerical Data Examples 1 to 5 according to the embodiment, respectively. Since a basic lens configuration is the same among the Numerical Data Examples 1 to 5, the lens configuration of the embodiment will be described with reference to the lens sectional view of Numerical Data Example 1.

Figure 1:
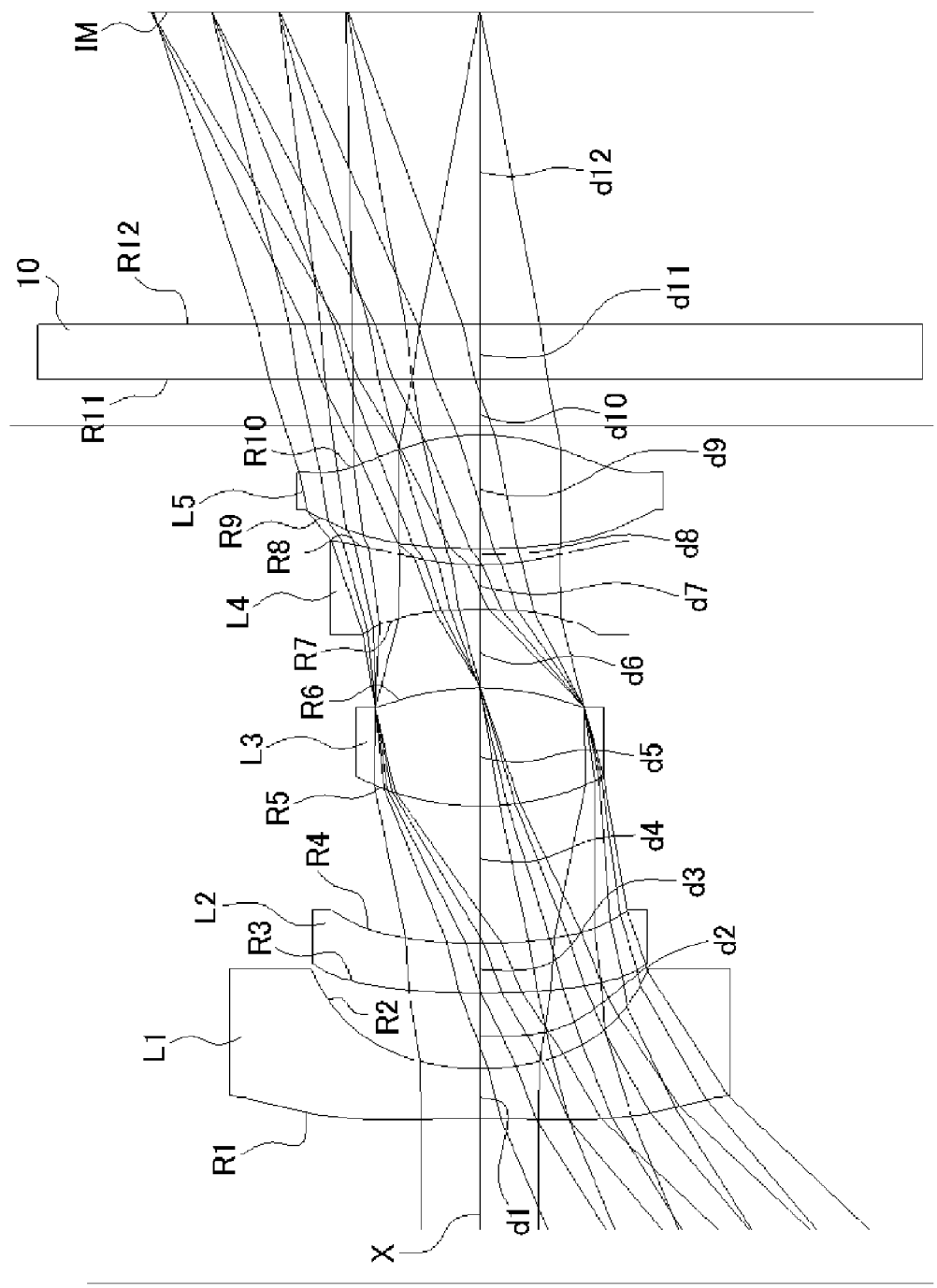
FIG. 1 is a schematic sectional view showing a configuration of an imaging lens in Numerical Data Example 1 according to an embodiment of the invention.

As shown in FIG. 1, the imaging lens of the embodiment has a first lens L1 having negative refractive power; a second lens L2 having negative refractive power; a third lens L3 having positive refractive power; a fourth lens L4 having negative refractive power; and a fifth lens L5 having positive refractive power, arranged in this order from an object side to an image side. A filter 10 is provided between the fifth lens L5 and an image plane IM. Here, the filter 10 may be optionally omitted. According to the imaging lens of the embodiment, an aperture stop is provided on an image-side surface of the third lens L3.

According to the imaging lens having the above-described configuration, the first lens L1 is formed in a shape so that a curvature radius R1 of an object-side surface thereof is negative and a curvature radius R2 of an image-side surface is positive, i.e. a shape of a biconcave lens near an optical axis X. According to the embodiment, the object-side surface of the first lens L1 is formed as an aspheric surface having an inflection point. In other word, the object-side surface of the first lens L1 has a shape directing a concave surface thereof to the object side near the optical axis X, and has a shape directing a convex surface thereof to the object side at the periphery.

According to this embodiment, the inflection point is provided at a point that is close to 50% of the maximum effective diameter of the first lens L1. Here, the shape of the first lens L1 is not limited to the one in this embodiment. The shape of the first lens L1 can be any as long as the curvature radius R2 of the image-side surface is positive, and can be formed in a shape so that the curvature radius R1 and the curvature radius R2 are both positive, i.e. a shape of a meniscus lens directing a convex surface thereof to the object side near the optical axis X.

The second lens L2 is formed in a shape so that a curvature radius R3 of an object-side surface thereof and a curvature radius R4 of an image-side surface thereof are both positive, i.e. a shape of a meniscus lens directing a convex surface thereof to the object side near the optical axis X. According to the embodiment, the object-side surface of the second lens L2 is formed as an aspheric surface, and is formed in a shape directing to the object side a convex surface that is sharply convex as it goes from the optical axis X to the periphery. In other words, the object-side surface of the second lens L2 is formed as an aspheric surface that is sharply curved as it goes from the optical axis X to the lens periphery. Here, the shape of the second lens L2 is not limited to the one in this embodiment. The shape of the second lens L2 can be any as long as the curvature radius R4 of the image-side surface is positive, and can be formed in a shape so that the curvature radius R3 is negative and the curvature radius R4 is positive, i.e. a shape of a biconcave lens near the optical axis X.

According to the embodiment, the second lens L2 is formed to have weaker refractive power than that of any of the first lens L1, the third lens L3, the fourth lens L4, and the fifth lens L5. With this configuration, it is possible to attain both a wide imaging angle of view and correction of distortion in a balanced manner, and also suitably attain miniaturization of the imaging lens.

The third lens L3 is formed in a shape so that a curvature radius R5 of an object-side surface thereof is positive and a curvature radius R6 of an image-side surface thereof is negative, and formed to have a shape of a biconvex lens near the optical axis X.

The fourth lens L4 is formed in a shape so that a curvature radius R7 of an object-side surface thereof is negative and a curvature radius R8 of an image-side surface thereof is positive, and is formed to have a shape of a biconcave lens near the optical axis X. In addition, the fifth lens L5 is formed in a shape so that a curvature radius R9 of an object-side surface thereof is positive and a curvature radius R10 of an image-side surface thereof is negative, and is formed to have a shape of a biconvex lens near the optical axis X. According to the embodiment, the image-side surface of the fifth lens L5 is formed as an aspheric surface having an inflection point. In other words, the image-side surface of the fifth lens L5 has a shape directing a convex surface thereof to the image plane side near the optical axis X and has a shape directing a concave surface thereof to the image plane side at the periphery.

According to the embodiment, the fifth lens L5 has the inflection at a point that is close to 60% of the maximum effective diameter thereof. Such shape of the image-side surface of the fifth lens L5 contributes to satisfactory correction of distortions with the shape of the object-side surface of the first lens L1 and the object-side surface of the second lens L2. More specifically, a light path of an off-axis light beam that enters the first lens L1 is corrected as the light beam passes the object-side surface of the first lens L1, the object-side surface of the second lens L2, and the image-side surface of the fifth lens L5 in the order. As a result, it is possible to restrain the distortion within satisfactory range. In addition, because of the shape of the fifth lens L5, it is possible to restrain an incident angle of a light beam emitted from the fifth lens L5 to the image plane IM within a certain range.

The imaging lens of the embodiment satisfies the following conditional expressions (1) to (8). For this reason, according to the imaging lens of the embodiment, it is possible to attain both a wide angle of view and satisfactory correction of aberrations of the imaging lens.

$$-40<f2/f<-5 \quad (1)$$

$$0.01<R2/R3<0.4 \quad (2)$$

$$0.02<f1/f2<0.8 \quad (3)$$

$$0.5<f3/f<1.2 \quad (4)$$

$$0.8<df/dr<2.5 \quad (5)$$

$$5<f45/f<15 \quad (6)$$

$$vd4<35, 45<vd5<80 \quad (7)$$

$$45<vd1<80, 45<vd2<80, 45<vd3<80 \quad (8)$$

In the above conditional expressions,
f: Focal length of the whole lens system
f1: Focal length of the first lens L1
f2: Focal length of the second lens L2
f3: Focal length of the third lens L3
f45: Composite focal length of the fourth lens L4 and the fifth lens L5
R2: Curvature radius of an image-side surface of the first lens L1
R3: Curvature radius of an object-side surface of the second lens L2
df: Distance on an optical axis from an image-side surface of the second lens L2 to an object-side surface of the third lens L3
dr: Distance on the optical axis from an image-side surface of the third lens L3 to an object-side surface of the fourth lens L4
vd1: Abbe's number of the first lens L1
vd2: Abbe's number of the second lens L2
vd3: Abbe's number of the third lens L3
vd4: Abbe's number of the fourth lens L4
vd5: Abbe's number of the fifth lens L5

The imaging lens of this embodiment satisfies the following conditional expression (3A) in order to restrain distortion and astigmatism within more satisfactory ranges:

$$0.02<f1/f2<0.5 \quad (3A)$$

Furthermore, the imaging lens of this embodiment satisfies the following conditional expression (9) when the fourth lens L4 has a focal length f4 and the fifth lens L5 has a focal length f5:

$$-1.5 < f4/f5 < -0.5 \quad (9)$$

Here, it is not necessary to satisfy all of the conditional expressions (1) to (9) (including the conditional expression (3A), which is hereinafter the same). When any single one of the conditional expressions is individually satisfied, it is possible to obtain an effect corresponding to the respective conditional expression.

In the embodiment, each lens has a lens surface that is formed as an aspheric surface as necessary. When the aspheric surfaces applied to the lens surfaces have an axis Z in the optical axis direction, a height H in a direction perpendicular to the optical axis, a conical coefficient k, and aspheric coefficients $A_4$, $A_6$, $A_8$, $A_{10}$, $A_{12}$, and $A_{14}$, a shape of the aspheric surfaces of the lens surfaces may be expressed as follows:

$$Z = \frac{\frac{H^2}{R}}{1 + \sqrt{1 - (k+1)\frac{H^2}{R^2}}} + A_4 H^4 + A_6 H^6 + A_8 H^8 + A_{10} H^{10} + A_{12} H^{12} + A_{14} H^{14} \quad \text{[Formula 1]}$$

Next, Numerical Data Examples of the embodiment will be described. In each of the Numerical Data Examples, f represents a focal length of a whole lens system, Fno represents an F number, and ω represents a half angle of view, respectively. In addition, i represents a surface number counted from the object side, R represents a curvature radius, d represents a distance between lens surfaces (surface spacing) on the optical axis, Nd represents a refractive index for a d line, and νd represents Abbe's number for the d line, respectively. Here, aspheric surfaces are indicated with surface numbers i affixed with * (asterisk).

NUMERICAL DATA EXAMPLE 1

Basic lens data are shown below.
f=2.84 mm, Fno=2.44, ω=46.9°

Unit: mm

Surface Data

| Surface Number i | R | d | Nd | νd |
|---|---|---|---|---|
| (Object) | ∞ | 250 | | |
| 1* | −12.79 | 0.45 | 1.53 | 56.0 |
| 2* | 2.24 | 0.68 | | |
| 3* | 6.18 | 0.45 | 1.53 | 56.0 |
| 4* | 5.40 | 1.24 (=df) | | |
| 5* | 2.57 | 1.06 | 1.53 | 56.0 |
| 6*(Stop) | −2.32 | 0.72 (=dr) | | |
| 7* | −5.06 | 0.40 | 1.61 | 26.0 |
| 8* | 2.33 | 0.15 | | |
| 9* | 8.25 | 1.03 | 1.53 | 56.0 |
| 10* | −1.92 | 0.50 | | |
| 11 | ∞ | 0.50 | 1.52 | 64.1 |
| 12 | ∞ | 2.81 | | |
| (Image Plane) | ∞ | | | | f1 = −3.53 mm
f2 = −100.00 mm
f3 = 2.47 mm
f4 = −2.55 mm
f5 = 3.02 mm
f45 = 24.28 mm

Aspheric Surface Data

First Surface k = 0.000, $A_4$ = 3.446E−02, $A_6$ = −3.599E−03, $A_8$ = −8.291E−05, $A_{10}$ = 1.543E−05
Second Surface k = 0.000, $A_4$ = 1.750E−02, $A_6$ = −1.105E−02, $A_8$ = 3.441E−02, $A_{10}$ = −1.719E−02, $A_{12}$ = 3.262E−03
Third Surface k = 0.000, $A_4$ = −3.026E−02, $A_6$ = 3.233E−02, $A_8$ = −1.004E−02, $A_{10}$ = 2.042E−03
Fourth Surface k = 0.000, $A_4$ = 3.205E−02, $A_6$ = −3.662E−03, $A_8$ = 8.714E−03, $A_{10}$ = −2.056E−03
Fifth Surface k = 0.000, $A_4$ = 2.103E−02, $A_6$ = −3.153E−02, $A_8$ = 3.669E−02, $A_{10}$ = −2.507E−02, $A_{12}$ = 5.415E−03
Sixth Surface k = −6.021, $A_4$ = −2.650E−02, $A_6$ = 1.713E−03, $A_8$ = 1.064E−02, $A_{10}$ = −1.641E−02, $A_{12}$ = 6.241E−03
Seventh Surface k = 0.000, $A_4$ = −1.003E−01, $A_6$ = 2.765E−03, $A_8$ = −5.120E−02, $A_{10}$ = 9.268E−02, $A_{12}$ = −4.181E−02
Eighth Surface k = 0.000, $A_4$ = −6.169E−02, $A_6$ = −2.045E−02, $A_8$ = 1.781E−02, $A_{10}$ = −3.303E−03, $A_{12}$ = −2.295E−04
Ninth Surface k = 0.000, $A_4$ = 6.242E−02, $A_6$ = −1.454E−02, $A_8$ = −6.595E−03, $A_{10}$ = 6.315E−03, $A_{12}$ = −1.348E−03
Tenth Surface k = 0.000, $A_4$ = 3.200E−02, $A_6$ = 1.686E−03, $A_8$ = 1.200E−02, $A_{10}$ = 1.294E−03, $A_{12}$ = −1.979E−03, $A_{14}$ = 2.615E−04

The values of the respective conditional expressions are as follows:
f2/f=−35.21
R2/R3=0.36
f1/f2=0.035
f3/f=0.87
df/dr=1.72
f45/f=8.55
f4/f5=−0.84

Accordingly, the imaging lens of this Numerical Data Example 1 satisfies the respective conditional expressions (1) to (9). In addition, a distance on the optical axis X from the object-side surface of the first lens L1 to the image plane IM (length in air) is 9.82 mm, and miniaturization of the imaging lens is attained.

Figure 2:
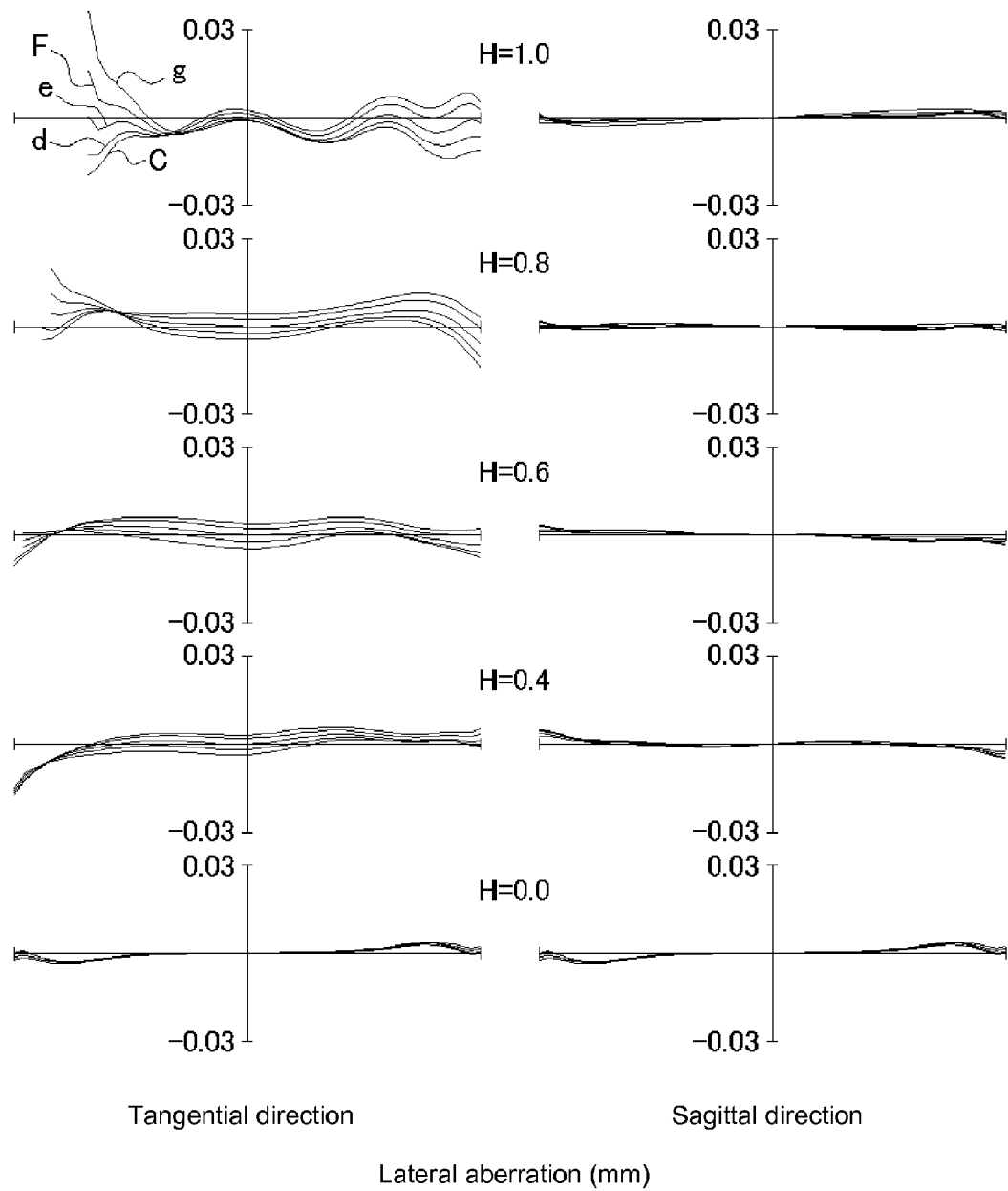
FIG. 2 is an aberration diagram showing a lateral aberration of the imaging lens of FIG. 1.
Figure 3:
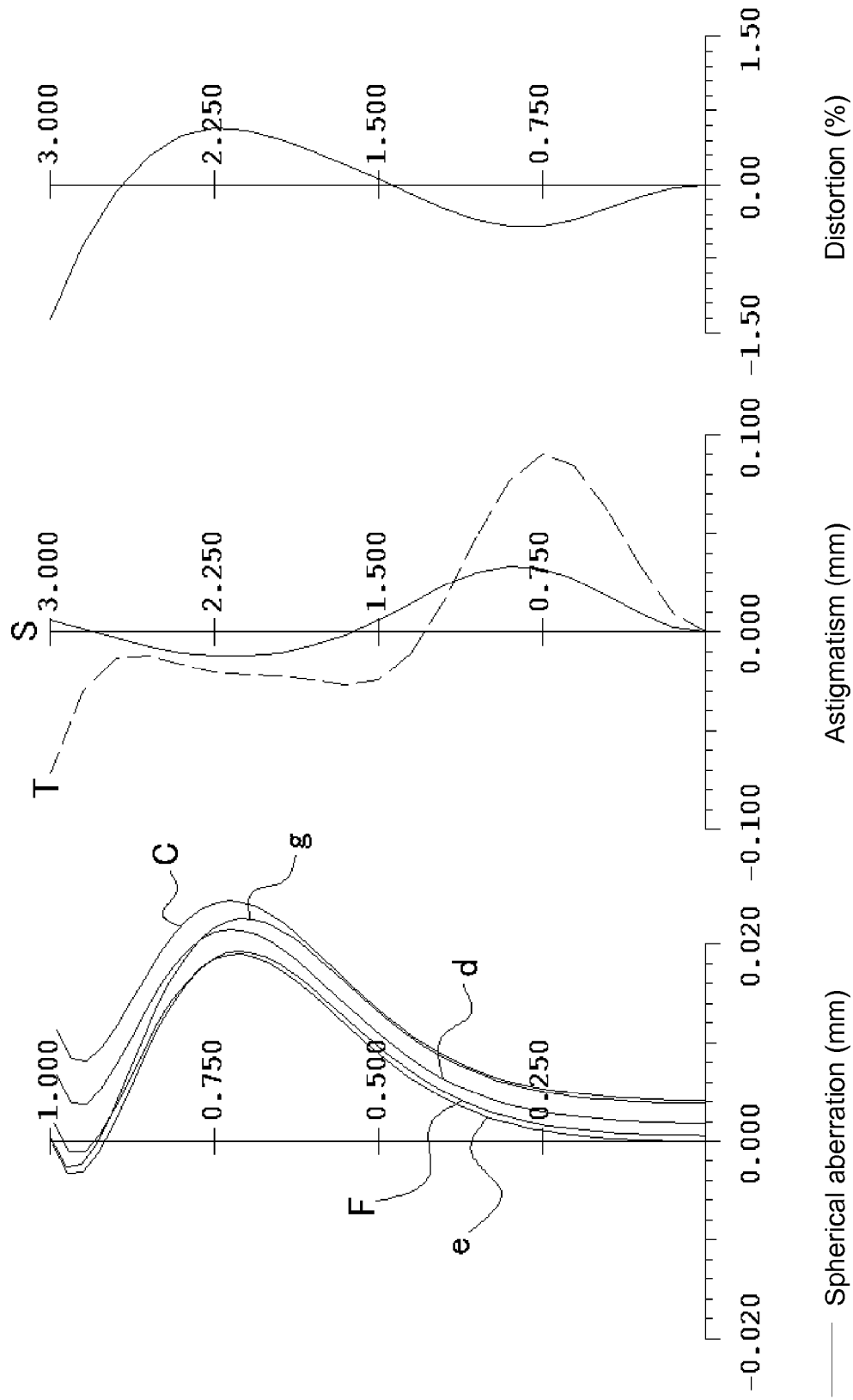
FIG. 3 is an aberration diagram showing a spherical aberration, an astigmatism, and a distortion of the imaging lens of FIG. 1.
Figure 4:
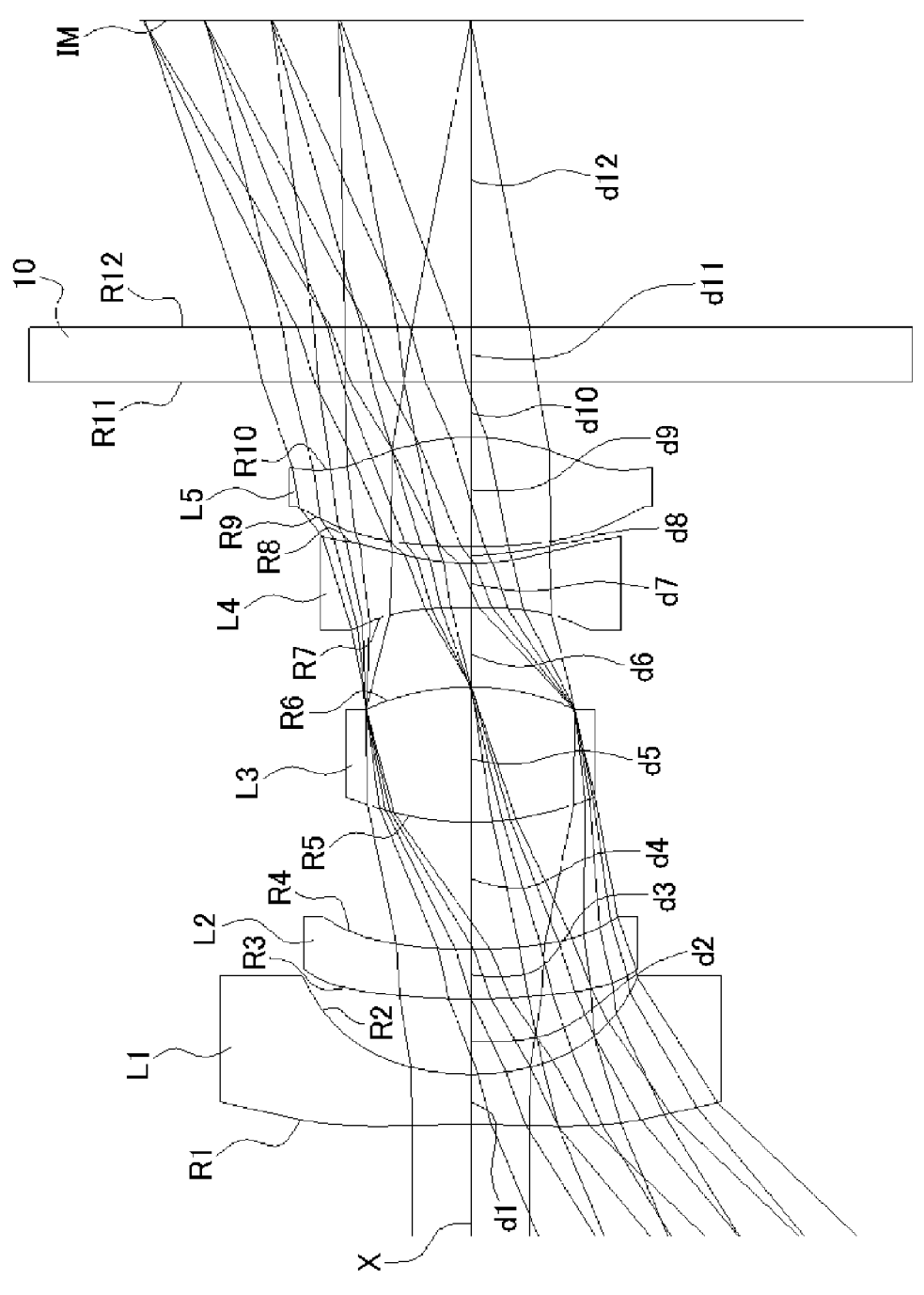
FIG. 4 is a schematic sectional view showing a configuration of an imaging lens in Numerical Data Example 2 according to the embodiment.

FIG. 2 shows a lateral aberration that corresponds to a ratio H of each image height to the maximum image height (hereinafter referred to as "image height ratio H") in the imaging lens of Numerical Data Example 1 by dividing into a tangential direction and sagittal direction (which is also the same in FIGS. 5, 8, 11, and 14). Furthermore, FIG. 3 shows a spherical aberration (mm), an astigmatism (mm), and a distortion (%) of the imaging lens of Numerical Data Example 1, respectively. In the aberration diagrams, for the spherical aberration diagram, aberrations are indicated for each wavelength of a g line (435.84 nm), an F line (486.13 nm), an e line (546.07 nm), a d line (587.56 nm), and a C line (656.27 nm). Further, in the astigmatism diagram, the aberration on the sagittal image surface S and the aberration on tangential image surface T are respectively indicated (which are the same in FIGS. 6, 9, 12, and 15). As shown in FIGS. 2 and 3, according to the imaging lens of Numerical Data Example 1, it is possible to satisfactorily correct an image surface and suitably correct each aberration.

NUMERICAL DATA EXAMPLE 2

Basic lens data are shown below.

f=2.84 mm, Fno=2.46, ω=46.9°

Unit: mm

Surface Data

| Surface Number i | R | d | Nd | vd |
|---|---|---|---|---|
| (Object) | ∞ | 250 | | |
| 1* | −11.64 | 0.45 | 1.53 | 56.0 |
| 2* | 2.24 | 0.68 | | |
| 3* | 6.26 | 0.45 | 1.53 | 56.0 |
| 4* | 5.40 | 1.15 (=df) | | |
| 5* | 2.75 | 1.23 | 1.53 | 56.0 |
| 6*(Stop) | −2.17 | 0.72 (=dr) | | |
| 7* | −7.88 | 0.40 | 1.61 | 26.0 |
| 8* | 2.02 | 0.15 | | |
| 9* | 7.17 | 0.99 | 1.53 | 56.0 |
| 10* | −1.99 | 0.50 | | |
| 11 | ∞ | 0.50 | 1.52 | 64.1 |
| 12 | ∞ | 2.77 | | |
| (Image Plane) | ∞ | | | | f1 = −3.47 mm
f2 = −90.04 mm
f3 = 2.48 mm
f4 = −2.58 mm
f5 = 3.03 mm
f45 = 28.01 mm

Aspheric Surface Data

First Surface k = 0.000, $A_4$ = 3.517E−02, $A_6$ = −3.879E−03, $A_8$ = −4.207E−05, $A_{10}$ = 1.425E−05
Second Surface k = 0.000, $A_4$ = 1.750E−02, $A_6$ = −1.105E−02, $A_8$ = 3.441E−02, $A_{10}$ = −1.719E−02, $A_{12}$ = 3.262E−03
Third Surface k = 0.000, $A_4$ = −3.105E−02, $A_6$ = 3.378E−02, $A_8$ = −1.052E−02, $A_{10}$ = 2.170E−03
Fourth Surface k = 0.000, $A_4$ = 3.205E−02, $A_6$ = −3.662E−03, $A_8$ = 8.714E−03, $A_{10}$ = −2.056E−03

-continued

Unit: mm

Fifth Surface k = 0.000, $A_4$ = 5.577E−03, $A_6$ = −8.975E−03, $A_8$ = −1.789E−04, $A_{10}$ = −8.581E−05, $A_{12}$ = −1.741E−03
Sixth Surface k = −4.450, $A_4$ = −3.024E−02, $A_6$ = 1.075E−02, $A_8$ = −2.034E−02, $A_{10}$ = 1.403E−02, $A_{12}$ = −4.934E−03
Seventh Surface k = 0.000, $A_4$ = −1.075E−01, $A_6$ = −2.729E−02, $A_8$ = 4.481E−02, $A_{10}$ = −3.235E−03, $A_{12}$ = −7.411E−03
Eighth Surface k = 0.000, $A_4$ = −1.039E−01, $A_6$ = 1.145E−02, $A_8$ = 1.077E−03, $A_{10}$ = −1.078E−04, $A_{12}$ = −2.254E−04
Ninth Surface k = 0.000, $A_4$ = 5.538E−02, $A_6$ = −5.087E−03, $A_8$ = −1.266E−02, $A_{10}$ = 8.470E−03, $A_{12}$ = −1.670E−03
Tenth Surface k = 0.000, $A_4$ = 3.103E−02, $A_6$ = 5.686E−03, $A_8$ = 9.425E−03, $A_{10}$ = 3.140E−03, $A_{12}$ = −2.706E−03, $A_{14}$ = 3.394E−04

The values of the respective conditional expressions are as follows:

f2/f=−31.70
R2/R3=0.36
f1/f2=0.039
f3/f=0.87
df/dr=1.60
f45/f=9.86
f4/f5=−0.84

Accordingly, the imaging lens of Numerical Example 2 satisfies the conditional expressions (1) to (9). In addition, a distance on the optical axis X from the object-side surface of the first lens L1 to the image plane IM (length in air) is 9.82 mm, and miniaturization of the imaging lens is attained.

Figure 5:
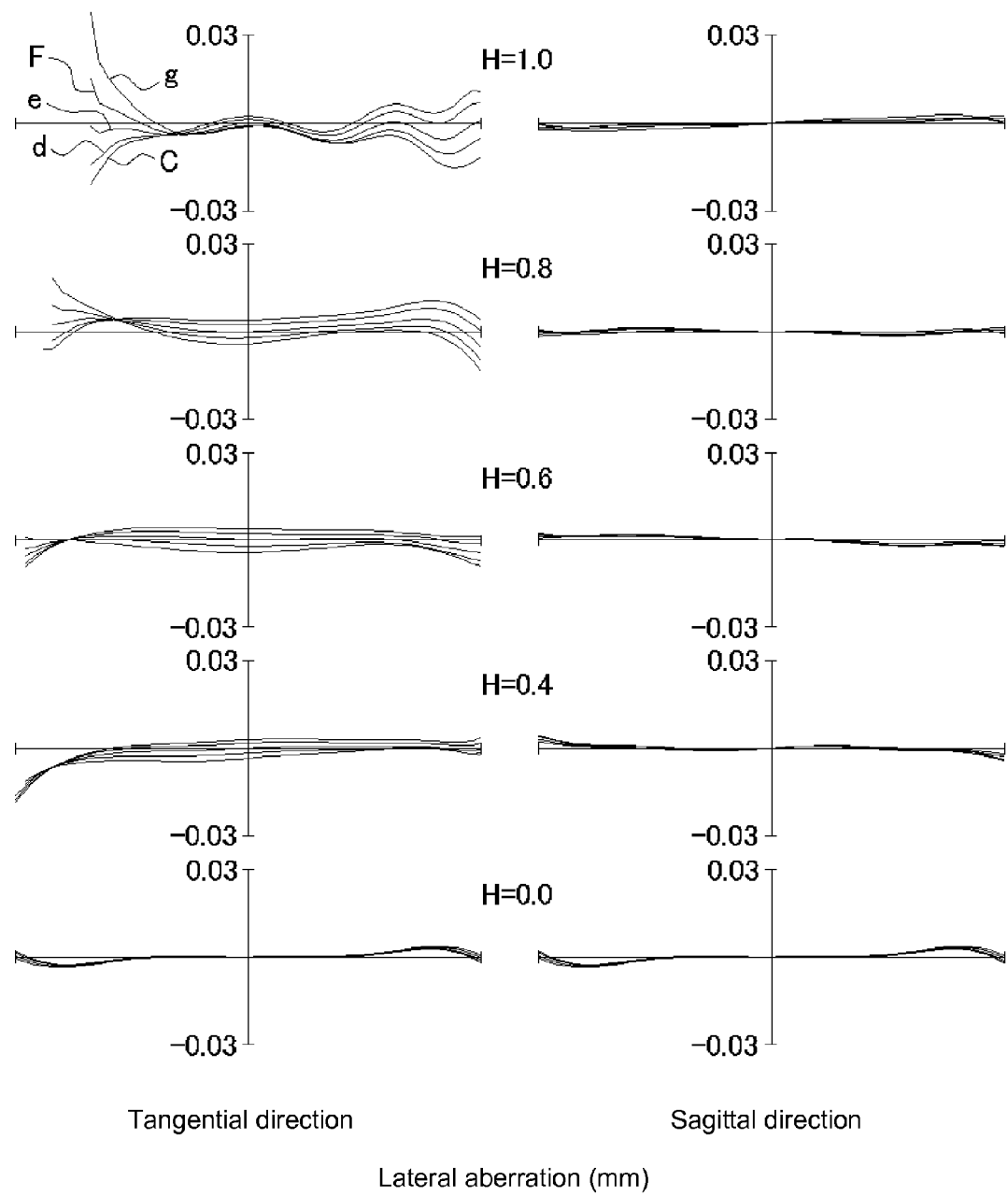
FIG. 5 is an aberration diagram showing a lateral aberration of the imaging lens of FIG. 4.
Figure 6:
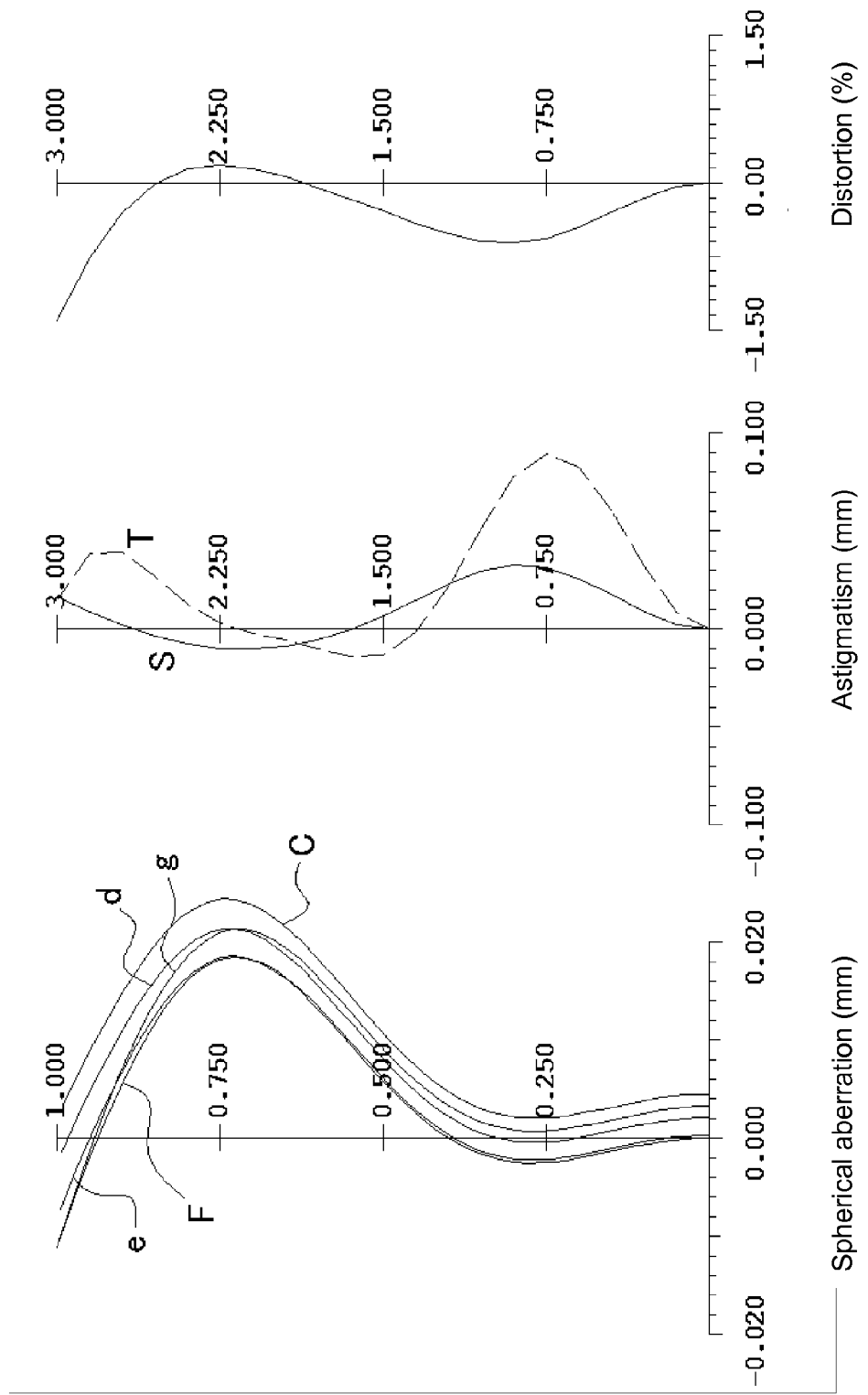
FIG. 6 is an aberration diagram showing a spherical aberration, an astigmatism, and a distortion of the imaging lens of FIG. 4.
Figure 7:
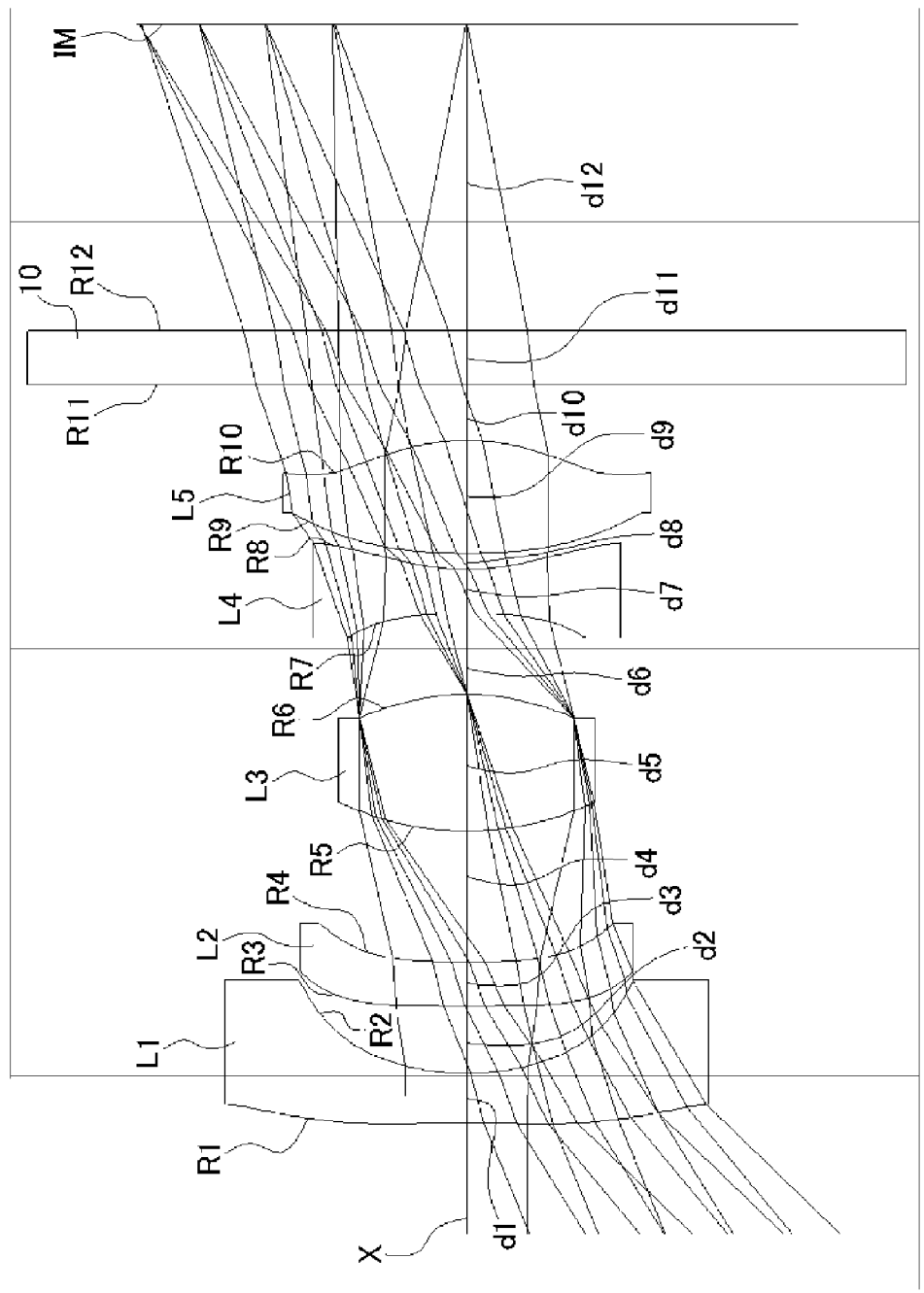
FIG. 7 is a schematic sectional view showing a configuration of an imaging lens in Numerical Data Example 3 according to the embodiment.

FIG. 5 shows a lateral aberration that corresponds to an image height ratio H and FIG. 6 shows a spherical aberration (mm), an astigmatism (mm), and a distortion (%) of the imaging lens of Numerical Data Example 2, respectively. As shown in FIGS. 5 and 6, according to the imaging lens of Numerical Data Example 2, it is also possible to satisfactorily correct an image surface and suitably correct each aberration, similarly to Numerical Data Example 1.

NUMERICAL DATA EXAMPLE 3

Basic lens data are shown below.

f=2.88 mm, Fno=2.39, ω=46.5°

Unit: mm

Surface Data

| Surface Number i | R | d | Nd | vd |
|---|---|---|---|---|
| (Object) | ∞ | 250 | | |
| 1* | −15.21 | 0.45 | 1.53 | 56.0 |
| 2* | 2.37 | 0.61 | | |
| 3* | 41.52 | 0.40 | 1.53 | 56.0 |
| 4* | 10.64 | 1.19 (=df) | | |
| 5* | 2.71 | 1.24 | 1.53 | 56.0 |

-continued

Unit: mm

| | | | | |
|---|---|---|---|---|
| 6*(Stop) | −2.17 | 0.74 (=dr) | | |
| 7* | −6.86 | 0.40 | 1.61 | 26.0 |
| 8* | 2.00 | 0.15 | | |
| 9* | 6.28 | 1.02 | 1.53 | 56.0 |
| 10* | −1.98 | 0.50 | | |
| 11 | ∞ | 0.50 | 1.52 | 64.1 |
| 12 (Image Plane) | ∞ | 2.78 | | | f1 = −3.80 mm
f2 = −26.87 mm
f3 = 2.47 mm
f4 = −2.48 mm
f5 = 2.94 mm
f45 = 26.61 mm

Aspheric Surface Data

First Surface $k = 0.000, A_4 = 3.686E-02, A_6 = -5.745E-03, A_8 = 1.870E-04, A_{10} = 5.956E-06$
Second Surface $k = 0.000, A_4 = 1.751E-02, A_6 = -1.104E-02, A_8 = 3.441E-02, A_{10} = -1.719E-02, A_{12} = 3.262E-03$
Third Surface $k = 0.000, A_4 = -9.374E-03, A_6 = 6.269E-02, A_8 = -2.628E-02, A_{10} = 4.905E-03$
Fourth Surface $k = 0.000, A_4 = 5.912E-02, A_6 = 3.630E-02, A_8 = -1.591E-02, A_{10} = 1.982E-03$
Fifth Surface $k = 0.000, A_4 = 1.531E-02, A_6 = -1.525E-02, A_8 = 1.315E-02, A_{10} = -9.891E-03, A_{12} = 1.540E-03$
Sixth Surface $k = -4.370, A_4 = -1.958E-02, A_6 = 3.714E-03, A_8 = -5.359E-03, A_{10} = 3.662E-04, A_{12} = 7.524E-06$
Seventh Surface $k = 0.000, A_4 = -1.051E-01, A_6 = -1.030E-02, A_8 = 2.021E-02, A_{10} = 6.272E-03, A_{12} = -9.737E-03$
Eighth Surface $k = 0.000, A_4 = -1.045E-01, A_6 = 1.099E-02, A_8 = 2.017E-03, A_{10} = -2.032E-03, A_{12} = 2.975E-04$
Ninth Surface $k = 0.000, A_4 = 5.185E-02, A_6 = -1.019E-02, A_8 = -7.167E-03, A_{10} = 5.543E-03, A_{12} = -1.096E-03$
Tenth Surface $k = 0.000, A_4 = 3.369E-02, A_6 = 3.097E-03, A_8 = 1.059E-02, A_{10} = 1.521E-03, A_{12} = -2.110E-03, A_{14} = 2.993E-04$ The values of the respective conditional expressions are as follows:
f2/f=−9.33
R2/R3=0.057
f1/f2=0.14
f3/f=0.86
df/dr=1.61
f45/f=9.24
f4/f5=−0.84

Accordingly, the imaging lens of Numerical Example 3 satisfies the conditional expressions (1) to (9). In addition, a distance on the optical axis X from the object-side surface of the first lens L1 to the image plane IM (length in air) is 9.81 mm, and miniaturization of the imaging lens is attained.

Figure 8:
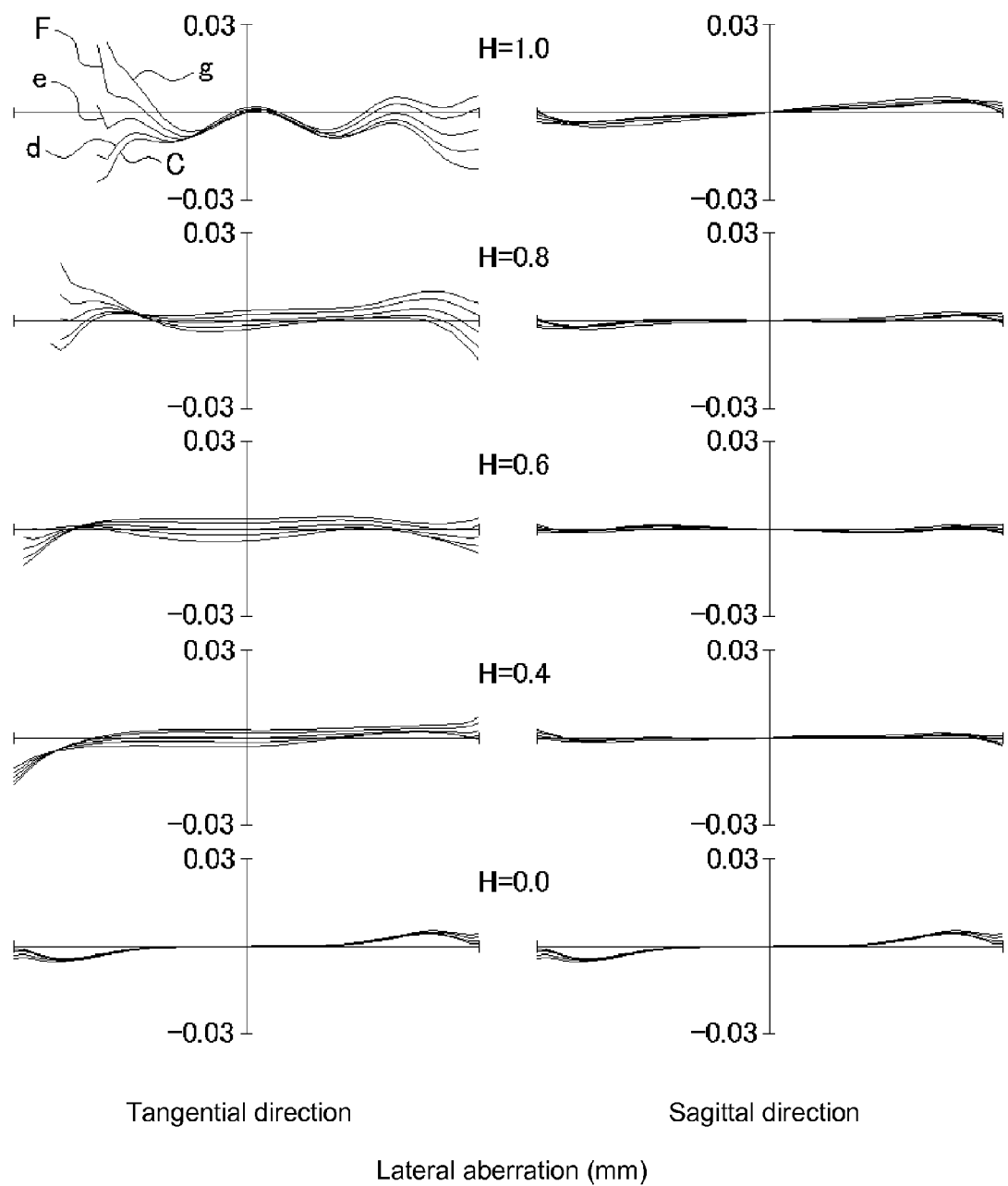
FIG. 8 is an aberration diagram showing a lateral aberration of the imaging lens of FIG. 7.
Figure 9:
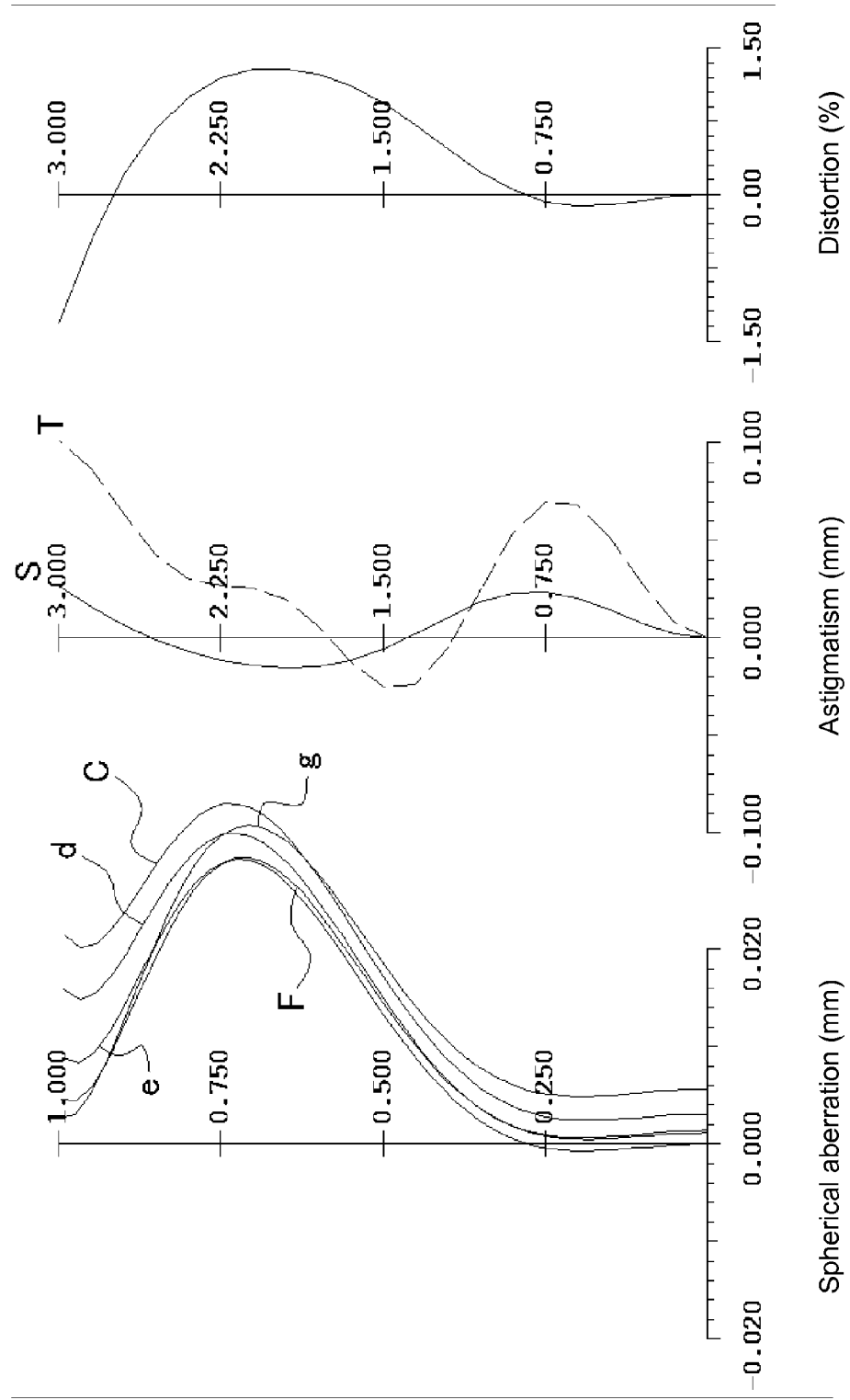
FIG. 9 is an aberration diagram showing a spherical aberration, an astigmatism, and a distortion of the imaging lens of FIG. 7.
Figure 10:
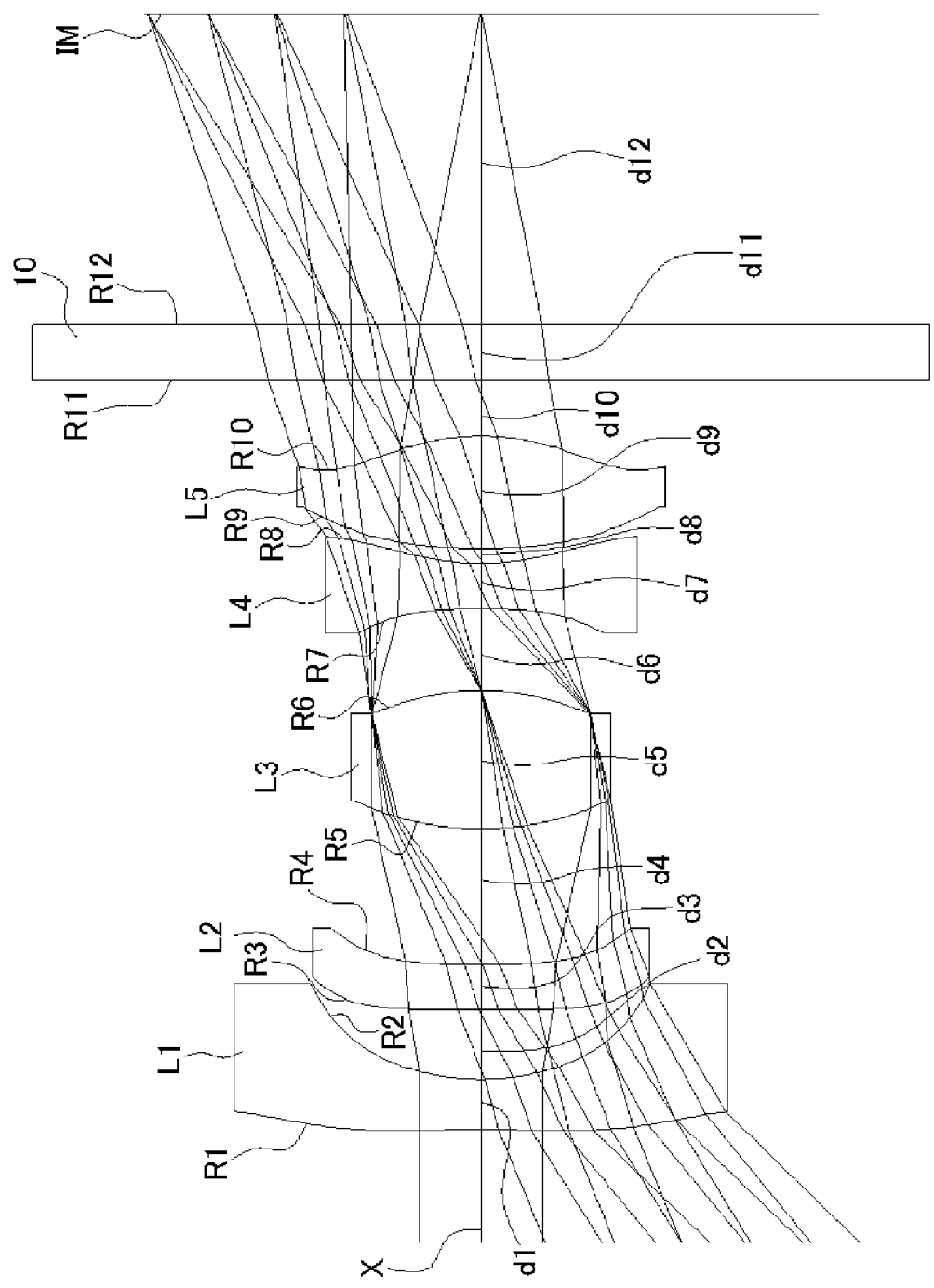
FIG. 10 is a schematic sectional view showing a configuration of an imaging lens in Numerical Data Example 4 according to the embodiment.

FIG. 8 shows a lateral aberration that corresponds to an image height ratio H and FIG. 9 shows a spherical aberration (mm), an astigmatism (mm), and a distortion (%) of the imaging lens of Numerical Data Example 3, respectively. As shown in FIGS. 8 and 9, according to the imaging lens of Numerical Data Example 3, it is also possible to satisfactorily correct an image surface and suitably correct each aberration, similarly to Numerical Data Example 1.

NUMERICAL DATA EXAMPLE 4

Basic lens data are shown below.
f=2.89 mm, Fno=2.41, ω=46.3°

Unit: mm

Surface Data

| Surface Number i | R | d | Nd | νd |
|---|---|---|---|---|
| (Object) | ∞ | 250 | | |
| 1* | −14.22 | 0.45 | 1.53 | 56.0 |
| 2* | 2.32 | 0.62 | | |
| 3* | 80.52 | 0.40 | 1.53 | 56.0 |
| 4* | 14.80 | 1.21 (=df) | | |
| 5* | 2.69 | 1.24 | 1.53 | 56.0 |
| 6*(Stop) | −2.15 | 0.74 (=dr) | | |
| 7* | −6.55 | 0.40 | 1.61 | 26.0 |
| 8* | 1.99 | 0.14 | | |
| 9* | 6.23 | 1.00 | 1.53 | 56.0 |
| 10* | −2.01 | 0.50 | | |
| 11 | ∞ | 0.50 | 1.52 | 64.1 |
| 12 (Image Plane) | ∞ | 2.76 | | | f1 = −3.69 mm
f2 = −34.00 mm
f3 = 2.45 mm
f4 = −2.44 mm
f5 = 2.97 mm
f45 = 39.98 mm

Aspheric Surface Data

First Surface $k = 0.000, A_4 = 3.687E-02, A_6 = -5.740E-03, A_8 = 1.887E-04, A_{10} = 6.376E-06$
Second Surface $k = 0.000, A_4 = 1.756E-02, A_6 = -1.098E-02, A_8 = 3.442E-02, A_{10} = -1.719E-02, A_{12} = 3.263E-03$
Third Surface $k = 0.000, A_4 = -9.178E-03, A_6 = 6.269E-02, A_8 = -2.629E-02, A_{10} = 4.902E-03$
Fourth Surface $k = 0.000, A_4 = 5.879E-02, A_6 = 3.639E-02, A_8 = -1.581E-02, A_{10} = 2.045E-03$
Fifth Surface $k = 0.000, A_4 = 1.545E-02, A_6 = -1.530E-02, A_8 = 1.306E-02, A_{10} = -9.959E-03, A_{12} = 1.505E-03$
Sixth Surface $k = -4.363, A_4 = -1.962E-02, A_6 = 3.683E-03, A_8 = -5.399E-03, A_{10} = 3.216E-04, A_{12} = -3.783E-05$
Seventh Surface $k = 0.000, A_4 = -1.044E-01, A_6 = -1.076E-02, A_8 = 1.963E-02, A_{10} = 5.953E-03, A_{12} = -9.788E-03$ -continued Unit: mm Eighth Surface k = 0.000, $A_4$ = −1.044E−01, $A_6$ = 1.120E−02, $A_8$ = 2.062E−03, $A_{10}$ = −2.045E−03, $A_{12}$ = 2.817E−04

Ninth Surface k = 0.000, $A_4$ = 5.193E−02, $A_6$ = −1.016E−02, $A_8$ = −7.135E−03, $A_{10}$ = 5.560E−03, $A_{12}$ = −1.092E−03

Tenth Surface k = 0.000, $A_4$ = 3.354E−02, $A_6$ = 3.112E−03, $A_8$ = 1.059E−02, $A_{10}$ = 1.515E−03, $A_{12}$ = −2.114E−03, $A_{14}$ = 2.978E−04

The values of the respective conditional expressions are as follows:

f2/f=−11.76
R2/R3=0.029
f1/f2=0.11
f3/f=0.85
df/dr=1.64
f45/f=13.83
f4/f5=−0.82

Accordingly, the imaging lens of Numerical Example 4 satisfies the conditional expressions (1) to (9). In addition, a distance on the optical axis X from the object-side surface of the first lens L1 to the image plane IM (length in air) is 9.79 mm, and miniaturization of the imaging lens is attained.

Figure 11:
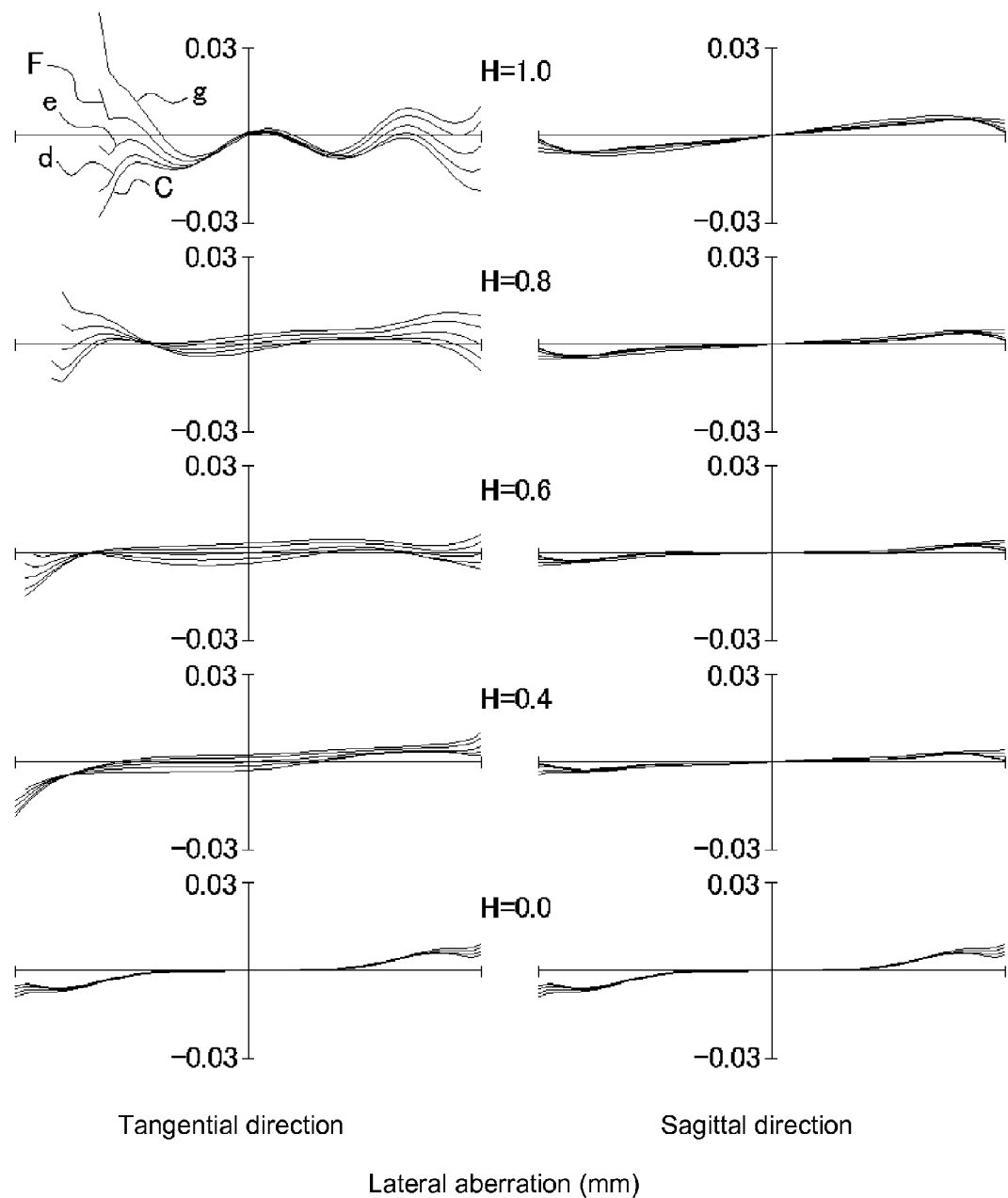
FIG. 11 is an aberration diagram showing a lateral aberration of the imaging lens of FIG. 10.
Figure 12:
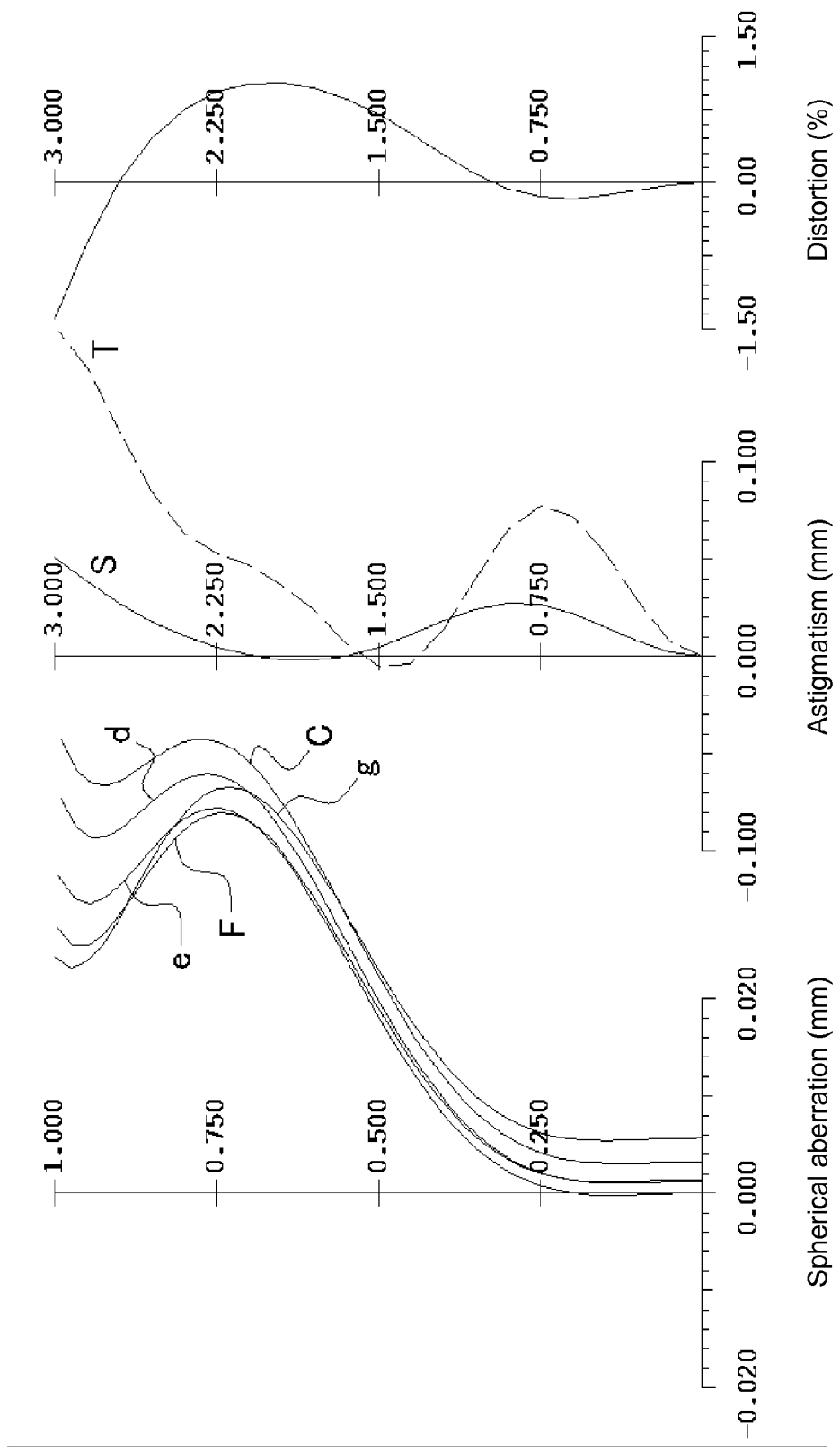
FIG. 12 is an aberration diagram showing a spherical aberration, an astigmatism, and a distortion of the imaging lens of FIG. 10.
Figure 13:
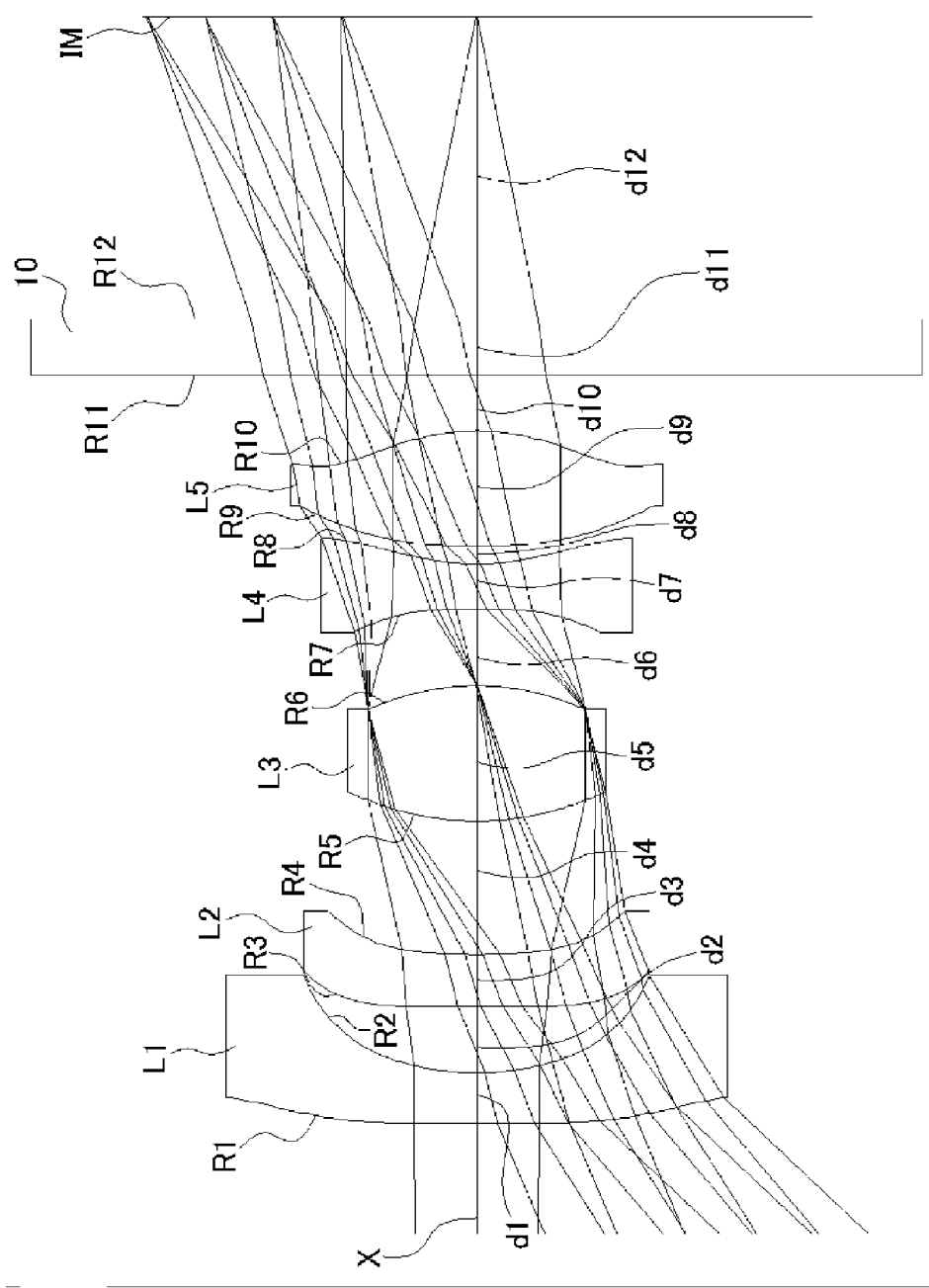
FIG. 13 is a schematic sectional view showing a configuration of an imaging lens in Numerical Data Example 5 according to the embodiment.

FIG. 11 shows a lateral aberration that corresponds to an image height ratio H and FIG. 12 shows a spherical aberration (mm), an astigmatism (mm), and a distortion (%) of the imaging lens of Numerical Data Example 4, respectively. As shown in FIGS. 11 and 12, according to the imaging lens of Numerical Data Example 4, it is also possible to satisfactorily correct an image surface and suitably correct each aberration, similarly to Numerical Data Example 1.

NUMERICAL DATA EXAMPLE 5

Basic lens data are shown below.
f=2.82 mm, Fno=2.32, ω=47.3°

Unit: mm

Surface Data

| Surface Number i | R | d | Nd | vd |
|---|---|---|---|---|
| (Object) | ∞ | 250 | | |
| 1* | −23.04 | 0.45 | 1.53 | 56.0 |
| 2* | 2.59 | 0.59 | | |
| 3* | 159.31 | 0.47 | 1.53 | 56.0 |
| 4* | 7.27 | 1.20 (=df) | | |
| 5* | 2.68 | 1.21 | 1.53 | 56.0 |
| 6*(Stop) | −2.16 | 0.70 (=dr) | | |
| 7* | −7.50 | 0.40 | 1.61 | 26.0 |
| 8* | 2.00 | 0.16 | | |
| 9* | 6.12 | 1.04 | 1.53 | 56.0 |
| 10* | −1.96 | 0.50 | | |
| 11 | ∞ | 0.50 | 1.52 | 64.1 |
| 12 | ∞ | 2.72 | | |
| (Image Plane) | ∞ | | | | f1 = −4.33 mm
f2 = −14.26 mm
f3 = 2.45 mm
f4 = −2.53 mm
f5 = 2.91 mm
f45 = 20.23 mm

Aspheric Surface Data

First Surface k = 0.000, $A_4$ = 3.691E−02, $A_6$ = −5.744E−03, $A_8$ = 1.841E−04, $A_{10}$ = 5.497E−06

Second Surface k = 0.000, $A_4$ = 1.960E−02, $A_6$ = −1.117E−02, $A_8$ = 3.437E−02, $A_{10}$ = −1.717E−02, $A_{12}$ = 3.276E−03

Third Surface k = 0.000, $A_4$ = −9.616E−03, $A_6$ = 6.246E−02, $A_8$ = −2.636E−02, $A_{10}$ = 4.911E−03

Fourth Surface k = 0.000, $A_4$ = 6.008E−02, $A_6$ = 3.682E−02, $A_8$ = −1.586E−02, $A_{10}$ = 1.863E−03

Fifth Surface k = 0.000, $A_4$ = 1.473E−02, $A_6$ = −1.537E−02, $A_8$ = 1.323E−02, $A_{10}$ = −9.785E−03, $A_{12}$ = 1.598E−03

Sixth Surface k = −4.383, $A_4$ = −1.953E−02, $A_6$ = 3.724E−03, $A_8$ = −5.307E−03, $A_{10}$ = 4.546E−04, $A_{12}$ = 1.197E−04

Seventh Surface k = 0.000, $A_4$ = −1.046E−01, $A_6$ = −9.770E−03, $A_8$ = 2.043E−02, $A_{10}$ = 6.342E−03, $A_{12}$ = −9.673E−03

Eighth Surface k = 0.000, $A_4$ = −1.043E−01, $A_6$ = 1.088E−02, $A_8$ = 1.922E−03, $A_{10}$ = −2.088E−03, $A_{12}$ = 2.659E−04

Ninth Surface k = 0.000, $A_4$ = 5.180E−02, $A_6$ = −1.019E−02, $A_8$ = −7.184E−03, $A_{10}$ = 5.529E−03, $A_{12}$ = −1.105E−03

Tenth Surface k = 0.000, $A_4$ = 3.427E−02, $A_6$ = 3.179E−03, $A_8$ = 1.061E−02, $A_{10}$ = 1.529E−03, $A_{12}$ = −2.108E−03, $A_{14}$ = 2.997E−04

The values of the respective conditional expressions are as follows:

f2/f=−5.06
R2/R3=0.016
f1/f2=0.30
f3/f=0.87
df/dr=1.71
f45/f=7.17
f4/f5=−0.87

Accordingly, the imaging lens of Numerical Example 5 satisfies the conditional expressions (1) to (9). In addition, a distance on the optical axis X from the object-side surface of the first lens L1 to the image plane IM (length in air) is 9.77 mm, and miniaturization of the imaging lens is attained.

Figure 14:
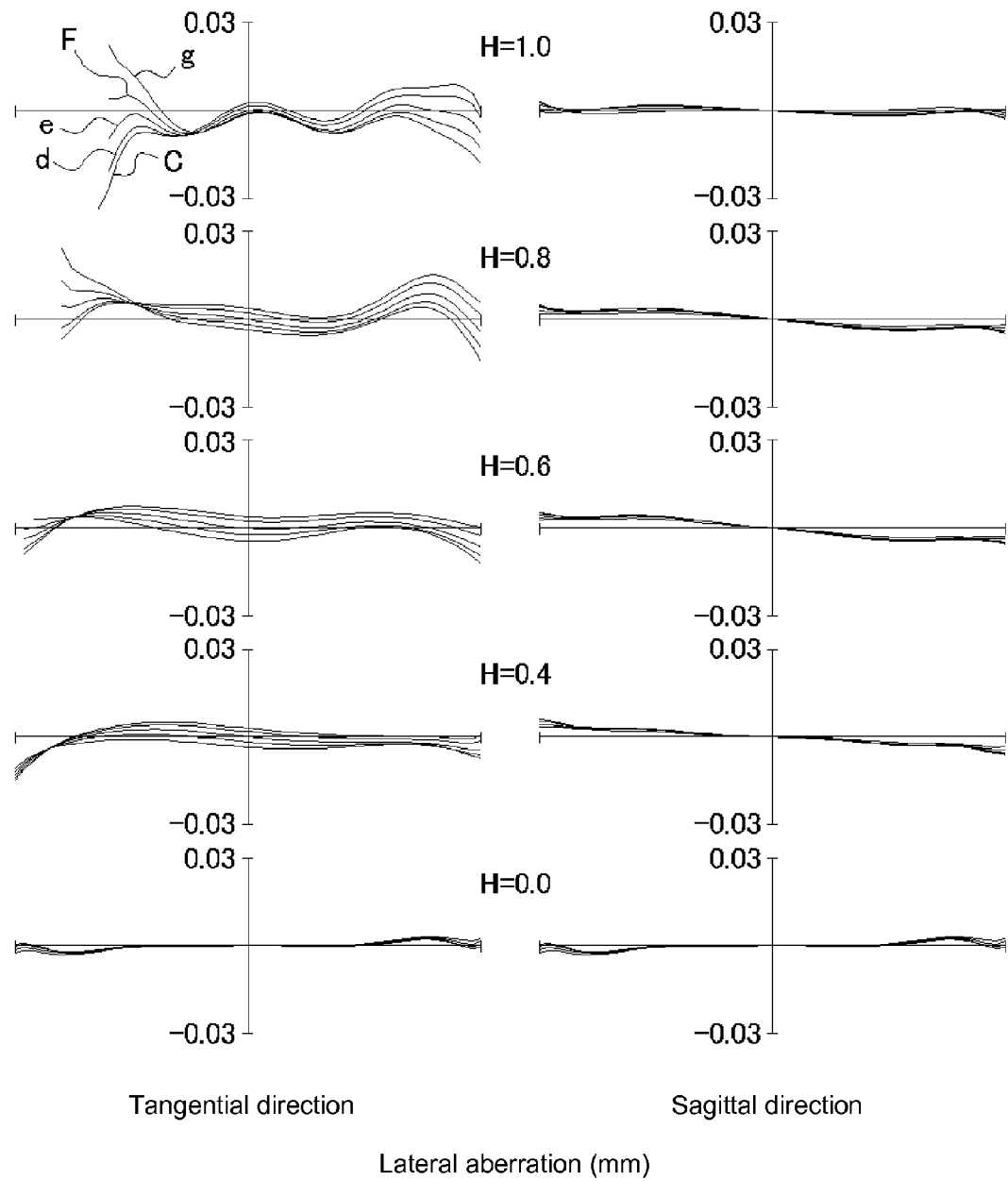
FIG. 14 is an aberration diagram showing a lateral aberration of the imaging lens of FIG. 13.
Figure 15:
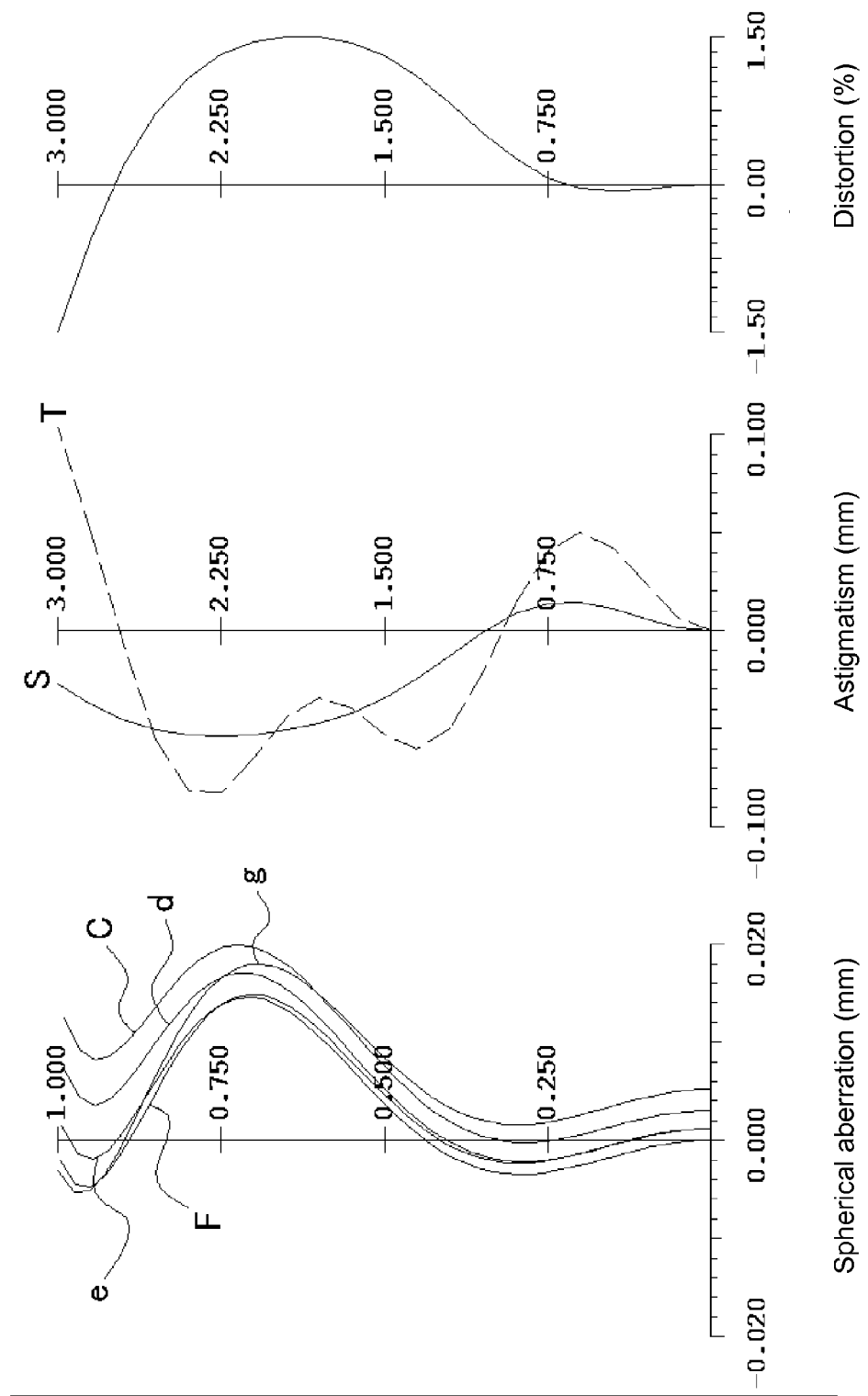
FIG. 15 is an aberration diagram showing a spherical aberration, an astigmatism, and a distortion of the imaging lens of FIG. 13.

FIG. 14 shows a lateral aberration that corresponds to an image height ratio H and FIG. 15 shows a spherical aberration (mm), an astigmatism (mm), and a distortion (%) of the imaging lens of Numerical Data Example 5, respectively. As shown in FIGS. 14 and 15, according to the imaging lens of Numerical Data Example 5, it is also possible to satisfactorily correct an image surface and suitably correct each aberration, similarly to Numerical Data Example 1.

Accordingly, when the imaging lens of the embodiment is applied in an imaging optical system for mounting in a cellular phone, a digital still camera, a portable information terminal, a security camera, an overhead camera, a scanner, a network camera, and the like, it is possible to attain both higher performance and miniaturization of the camera.

The invention may be applicable to an imaging lens for mounting on a device that requires the imaging lens to attain miniaturization and a wide imaging angle of view as well as ability of satisfactorily correcting aberrations, for example, a device such as a document camera or a scanner.

What is claimed is:

1. An imaging lens comprising:
    a first lens having negative refractive power;
    a second lens having negative refractive power;
    a third lens having positive refractive power;
    a fourth lens having negative refractive power; and
    a fifth lens having positive refractive power, arranged in this order from an object side to an image plane side,
    wherein said first lens is formed in a shape so that a curvature radius of a surface thereof on the image plane side is positive,
    said second lens is formed in a shape so that a surface thereof on an object side has a sharp convex surface facing the object side from an optical axis to an periphery, and a curvature radius of a surface thereof on the image plane side is positive,
    said third lens is formed in a shape so that a curvature radius of a surface thereof on the object side is positive and a curvature radius of a surface thereof on the image plane side is negative,
    said fourth lens is formed in a shape so that a curvature radius of a surface thereof on the object side is negative and a curvature radius of a surface thereof on the image plane side is positive, and
    said fifth lens is formed in a shape so that a curvature radius of a surface thereof on the object side is positive and a curvature radius of a surface thereof on the image plane side is negative, and the surface thereof on the image plane side is formed in an aspheric surface having an inflection point.

2. The imaging lens according to claim 1, wherein said second lens is formed to have refractive power weaker than that of the first lens, the third lens, the fourth lens, and the fifth lens.

3. The imaging lens according to claim 1, wherein said second lens has a focal length f2 so that the following expression is satisfied when a whole lens system has a focal length f:

$-40 < f2/f < -5$.

4. The imaging lens according to claim 1, wherein said first lens has the surface on the image plane side having the curvature radius R2 and the second lens has the surface on the object side having the curvature radius R3 so that the following expression is satisfied:

$0.01 < R2/R3 < 0.4$.

5. The imaging lens according to claim 1, wherein said first lens has a focal length f1 and said second lens has a focal length f2 so that the following expression is satisfied:

$0.02 < f1/f2 < 0.8$.

6. The imaging lens according to claim 1, wherein said third lens has a focal length f3 so that the following expression is satisfied when a whole lens system has a focal length f:

$0.5 < f3/f < 1.2$.

7. The imaging lens according to claim 1, wherein said second lens, said third lens, and said fourth lens are arranged so that a distance df on an optical axis from the surface of the second lens on the image plane side to the surface of the third lens on the object side and a distance dr on the optical axis from the surface of the third lens on the image plane side to the surface of the fourth lens on the object side satisfy the following expression:

$0.8 < df/dr < 2.5$.

8. The imaging lens according to claim 1, wherein said fourth lens and said fifth lens have a composite focal length f45 so that the following expression is satisfied when a whole lens system has a focal length f:

$5 < f45/f < 15$.

9. The imaging lens according to claim 1, wherein said fourth lens has an Abbe's number vd4 and said fifth lens has an Abbe's number vd5 so that the following expressions are satisfied:

$vd4 < 35$;

$45 < vd5 < 80$.

10. The imaging lens according to claim 9, wherein said first lens has an Abbe's number vd1, said second lens has an Abbe's number vd2, and said third lens has an Abbe's number vd3 so that the following expressions are satisfied:

$45 < vd1 < 80$;

$45 < vd2 < 80$;

$45 < vd3 < 80$.

* * * * *